United States Patent
Zhang et al.

(10) Patent No.: US 10,321,424 B2
(45) Date of Patent: Jun. 11, 2019

(54) METHODS AND SYSTEM FOR SYNCHRONIZING NODES IN A WIRELESS NETWORK

(71) Applicant: Telefonaktiebolaget LM Ericsson (publ), Stockholm (SE)

(72) Inventors: Chunhui Zhang, Täby (SE); Angelo Centonza, Stockholm (SE); Garry Irvine, Ottawa (CA); Mikael Olofsson, Skärholmen (SE); Magnus Sandgren, Staffanstorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/573,570

(22) PCT Filed: Jul. 17, 2015

(86) PCT No.: PCT/IB2015/055449
§ 371 (c)(1),
(2) Date: Nov. 13, 2017

(87) PCT Pub. No.: WO2016/181198
PCT Pub. Date: Nov. 17, 2016

(65) Prior Publication Data
US 2018/0132199 A1    May 10, 2018

Related U.S. Application Data

(60) Provisional application No. 62/161,828, filed on May 14, 2015.

(51) Int. Cl.
*H04W 4/00* (2018.01)
*H04W 56/00* (2009.01)
(Continued)

(52) U.S. Cl.
CPC ......... *H04W 56/002* (2013.01); *H04L 5/1469* (2013.01); *H04W 56/001* (2013.01); *H04W 56/0065* (2013.01); *H04W 72/0446* (2013.01)

(58) Field of Classification Search
CPC .................................................. H04W 56/002
See application file for complete search history.

(56) References Cited

U.S. PATENT DOCUMENTS 8,817,401 B2 * 8/2014 Zhang .............. G11B 20/10027
360/39
2007/0140127 A1   6/2007 Frei
(Continued)

OTHER PUBLICATIONS

Dr. Martin Nuss, "TD-LTE and LTE-Advanced Networks Need Correct Time and Phase Data ," Published in: Electronic Design, Date of Publication: May 22, 2014 consisting of 7-pages.
(Continued)

*Primary Examiner* — Gerald A Smarth
(74) *Attorney, Agent, or Firm* — Christopher & Weisberg, P.A.

(57) ABSTRACT

A method and nodes for wireless timing synchronization of a target node and a source node. In some embodiments, a request is sent to a source node for time synchronizing the target node with the source node. A first time, T1, indicative of time of transmission of a first radio signal from the source node to the target node is determined. A second time, T2, indicative of time of receipt of the first radio signal at the target node is determined. A third time, T3, indicative of time of transmission of a second radio signal from the target node to the source node is determined. A fourth time, T4, indicative of time of receipt of the second radio signal at the source node is determined. A clock offset based on T1, T2, T3 and T4 for use in time synchronizing the target node with the source node is determined.

31 Claims, 17 Drawing Sheets

(51) Int. Cl.
*H04L 5/14* (2006.01)
*H04W 72/04* (2009.01)

(56) References Cited

U.S. PATENT DOCUMENTS

| | | | |
|---|---|---|---|
| 2012/0155341 A1* | 6/2012 | Yamamoto | H04B 7/0617 370/281 |
| 2012/0184311 A1* | 7/2012 | Yamamoto | H04W 56/002 455/502 |
| 2012/0184312 A1* | 7/2012 | Yamamoto | H04J 11/0053 455/502 |
| 2012/0246265 A1 | 9/2012 | Bajko | |
| 2012/0314663 A1* | 12/2012 | Dwivedi | H04L 1/1816 370/329 |
| 2013/0322557 A1* | 12/2013 | Poulain | H04H 20/103 375/259 |
| 2014/0198772 A1 | 7/2014 | Baldemair et al. | |
| 2014/0213193 A1 | 7/2014 | Zhang et al. | |
| 2014/0254511 A1 | 9/2014 | Aldana et al. | |
| 2015/0092573 A1* | 4/2015 | Zhang | H04W 24/10 370/252 |
| 2016/0135203 A1* | 5/2016 | Kim | H04W 48/20 370/315 |

OTHER PUBLICATIONS

Sven Fisher, "Observed Time Difference of Arrival (OTDOA) Positioning in 3GPP LTE," white paper for Qualcomm Technologies, Inc. dated Jun. 6, 2014 consisting of 62-pages.

3GPP TS 28.632 V12.0.1 (Oct. 2014) 3rd Generation Partnership Project; Technical Specification Group Services and System Aspects; Telecommunication management; Inventory Management (IM) Network Resource Model (NRM) Integration Reference Point (IRP); Information Service (IS) (Release 12) Oct. 29, 2014 consisting of 25-pages.

3GPP TS 36.413 V124.0 (Dec. 2014) 3rd Generation Partnership Project; Technical Specification Group Radio Access Network; Evolved Universal Terrestrial Radio Access Network (E-UTRAN); S1 Application Protocol (S1AP) (Release 12) dated Dec. 26, 2014 consisting of 301-pages.

International Search Report and Written Opinion issued by the International Searching Authority dated Jan. 19, 2016 in corresponding PCT Application U.S. Appl. No. PCT/IB2015/055449, consisting of 11-pages.

* cited by examiner

METHODS AND SYSTEM FOR SYNCHRONIZING NODES IN A WIRELESS NETWORK

CROSS-REFERENCE TO RELATED APPLICATIONS

This Application is a Submission Under 35 U.S.C. § 371 for U.S. National Stage Patent Application of International Application Number: PCT/IB2015/055449, filed Jul. 17, 2015 entitled "METHODS AND SYSTEM FOR SYNCRHONIZING NODES IN A WIRELESS NETWORK" and U.S. Provisional Application Ser. No. 62/161,828, filed May 14, 2015 entitled "METHODS FOR DISTRIBUTING SYNC OVER THE AIR SYNCHRONIZATION," the entireties of both of which are incorporated herein by reference.

TECHNICAL FIELD

A method and system for achieving synchronization between nodes in a wireless communication network.

BACKGROUND

Third generation partnership project (3GPP) Long Term Evolution (LTE) technology is a mobile broadband wireless communication technology in which transmissions from base stations, e.g., eNodeBs, to wireless devices such as mobile stations (also referred to as user equipment (UE)) are sent using orthogonal frequency division multiplexing (OFDM). OFDM splits the signal into multiple parallel sub-carriers in the frequency domain. The basic unit of transmission in LTE is a resource block (RB) which in its most common configuration consists of 12 subcarriers and 7 OFDM symbols (one slot). As shown in the LTE physical resource diagram of FIG. 1, a unit of one subcarrier and 1 OFDM symbol is referred to as a resource element (RE). Thus, an RB consists of 84 REs. An LTE radio subframe is composed of two slots in time and multiple resource blocks in frequency with the number of RBs determining the bandwidth of the system (see FIG. 2). Furthermore, the two RBs in a subframe that are adjacent in time are denoted as an RB pair. Currently, LTE supports standard bandwidth sizes of 6, 15, 25, 50, 75 and 100 RB pairs. In the time domain, LTE downlink transmissions are organized into radio frames of 10 ms, each radio frame consisting of ten equally-sized subframes of length Tsubframe=1 ms.

The signal transmitted by the eNB in a downlink, which is the link carrying transmissions from the eNB to the UE, may be transmitted from multiple antennas and the signal may be received at a UE that has multiple antennas. The radio channel distorts the transmitted signals from the multiple antenna ports. In order to demodulate any transmissions on the downlink, a UE relies on reference symbols (RS) that are transmitted on the downlink. These reference symbols and their position in the time-frequency grid are known to the UE and hence can be used to determine channel estimates by measuring the effect of the radio channel on these symbols. In Rel-11 of the LTE standards and in prior releases of the LTE standards, there are multiple types of reference symbols. The common reference symbols are used for channel estimation during demodulation of control and data messages in addition to synchronization. The common reference symbols occur once every subframe. These reference symbols are shown in FIG. 2.

Heterogeneous networks, where the macro cells and the small cells have vastly different transmit powers, may be deployed in two main ways. In the first deployment type, the small cell layer and the macro cell layer share the same carrier frequencies which creates interference between the two layers. In the second deployment type, the small cell layer and macro cell layer are on separate frequencies.

Referring to FIG. 3, the network architecture for LTE allows messages to be sent between eNBs 12 via an X2 interface. An eNB 11 also can communicate with other nodes in the network, e.g., to the Mobility Management Entity (MME) 14 via the S1 interface. In current LTE specifications, methods are specified that allow some self-organizing network (SON) functionality where an eNB 11 can request information regarding another eNB 10 via the MME 14.

As used herein, the term "over the air" is defined as wireless communication. In other words, transmitting "over the air" refers to wireless transmission. Currently, network interface based signaling for over the air synchronization purposes is enabled by means of the S1: eNB Configuration Transfer and S1: MME Configuration Transfer procedures according to the process outlined in FIG. 4. This process is as follows:

1. The eNB1 11a generates an eNB Configuration Transfer message containing a SON Information Transfer IE with a SON Information Request IE set to "Time synchronization Info";
2. The MME 14 receiving the eNB Configuration Transfer message forwards the SON Information Transfer IE towards a synchronization candidate eNB2 11b indicated in the IE by means of the MME Configuration Transfer message;
3. The receiving eNB2 11b may reply with an eNB Configuration Transfer message towards the eNB1 11a including a SON Information Reply IE with the Timing Synchronization Information IE, which consists of Stratum Level and Synchronization Status of the sending node (additionally the message can include information about availability of the muting function and details of already active muting patterns). These two parameters can be defined as follows:
    a. Stratum Level: indicates the number of hops between the node to which the stratum level belongs to the source of a synchronized reference clock. That is, when the stratum level is M, the eNB is synchronized to an eNB whose stratum level is M−1, which in turn is synchronized to an eNB with stratum level M−2 and so on. The eNB with stratum level 0 is the synchronization source;
    b. Synchronization Status: indicates whether the node signalling such parameter is connected (via the number of hops stated in the Stratum Level) to a synchronized reference clock (e.g., a GPS source) or to a non-synchronized reference clock (e.g., a drifting clock);
4. The MME 14 receiving the eNB Configuration Transfer message from eNB2 11b forwards it to eNB 1 12a by means of the MME Configuration Transfer message;
5. The eNB1 11a selects the best available cell's signal as synchronization source and identifies whether there are neighbour cells interfering with the synchronization source signal. If such interfering cells are identified, e.g., in eNB2's cells, eNB1 sends an eNB Configuration Transfer including information about the cell selected as synchronization source as well as a request to activate muting on certain specific cells. The information on the synchronization source cell may consist of the synchronization RS period, offset, the synchronization node's stratum level;
6. The MME 14 receiving the eNB Configuration Transfer message from eNB1 11a forwards it to eNB2 12b by means of the MME Configuration Transfer message;
7. The eNB2 11b determines whether the muting request from eNB1 11a can be fulfilled and activates muting patterns that are most suitable to such request. eNB responds with an eNB Configuration Transfer message containing muting pattern information such as muting pattern period (period of muted subframes) and muting pattern offset;
8. The MME 14 receiving the eNB Configuration Transfer message from eNB2 11b forwards it to eNB1 12a by means of the MME Configuration Transfer message;
9. If eNB1 11a determines that muting at eNB2's cells is no more needed, eNB1 11a can trigger an eNB Configuration Transfer message containing a muting deactivation request;
10. The MME 14 receiving the eNB Configuration Transfer message from eNB1 11a forwards it to eNB2 11b by means of the MME Configuration Transfer message. The eNB2 11b may then deactivate the muting pattern, i.e., eNB2 11b, may freely transmit on the subframes previously muted.

The Radio Interface Based Synchronization (RIBS) functions standardized in 3GPP Release 12 and described above have the purpose of enabling a more accurate detection of the synchronization source signal, to improve the synchronization accuracy. Hence, muting patterns activation should enable an enhancement of the synchronization source signal with respect to the case where interference from aggressor cells is not mitigated.

A management system for a wireless network is shown in FIG. 5. The node elements (NE) 11a and 11 b, also referred to as eNodeB, are managed by a domain manager (DM) 16a, also referred to as an operation and support system (OSS). A DM 16a, or DM 16b, referred to herein collectively as domain managers 16, may further be managed by a network manager (NM) 18. Two NEs 11a and 11b are interfaced by X2, whereas the interface between two DMs 16 is referred to as Itf-P2P. The management system may configure the network elements, as well as receive observations associated to features in the network elements. For example, a DM 16 observes and configures NEs 11, while a NM 18 observes and configures a DM 16, as well as an NE 11 via a DM 16.

By means of configuration via the DM 16, the NM 18 and related interfaces, functions over the X2 and S1 interfaces can be carried out in a coordinated way throughout the radio access network (RAN), eventually involving the Core Network, i.e., MME 14 and S-GWs.

FIG. 6 is a block diagram of a general radio base station structure 11 where the digital baseband process 20 contains 3GPP defined layer 1 & 2 functions which generate the baseband in-phase and quadrature (IQ) data signal. The IQ baseband signal is then filtered and up converted in the digital up conversion (DUC) block 22 to a higher sampling rate signal, converted to analog be a digital to analog converter 24 which is later mixed and amplified in an RF front end 26 and sent to the antenna 28 to be to be transmitted down link. For the uplink, the received RF signal is first filtered and mixed in the RF front 26 end and then sampled by an analog to digital converter (ADC) 30 and input to a digital down conversion (DDC) block 32 which channelizes and converts from a higher sampling rate to an IQ baseband sampling rate. The baseband processing 20 will further decode the user information data from the baseband IQ signal.

Current synchronization techniques rely on extraction of timing from Global Navigation Satellite Systems (GNSS) or the Precision Time Protocol (PTP). These techniques have inherent drawbacks. In the case of PTP, transport network packet delay variation and delay asymmetry may require specialized network equipment to mitigate. In the case of GNSS, obstructions to the sky-view and/or jamming from terrestrial interference place constraints on location of the GNSS antenna which may be inconvenient or costly.

The synchronization procedure described above with reference to FIG. 4 does not take into account synchronization source signal propagation delays at the synchronization target node in order to achieve an accurate synchronization to the source signal. Informing the synchronization target node of the geolocation of the transmission points of the synchronization source and the target would make it possible to calculate the minimum propagation delay between synchronization source and synchronization target nodes. An example of such method is described in U.S. Patent Application No. 62/140,736 entitled "Accurate Over the Air Synchronization, filed on Mar. 31, 2015 and herein incorporated by reference in its entirety. However, in a number of cases, such as indoor base station deployments, it might not be possible to know the geolocation of transmission points (TPs), possibly because acquisition of global navigation satellite signal (GNSS) coordinates to geolocate TPs is not possible due to indoor sheltering from GNSS. Also, it may not be possible to compensate for propagation delays arising from non line-of-sight propagation.

Therefore, if an eNB that needs to synchronize detects a number of cells in its neighborhood and if the procedures described with reference to FIG. 4 to acquire Time Synchronization Information were carried out, the eNB would determine the best cell for synchronization and then send muting requests towards nearby aggressors or interfering nodes. However, such procedure may not lead to good synchronization results if the location of the transmission point sending the synchronization source or target signal is indoor or the signal is affected by multipath propagation delays as the signal travels from the synchronization source to the synchronization target.

Indeed, current synchronization requirements for time division duplex (TDD) systems are interpreted as allowing a synchronization margin of +/−1.5 us between cells in a given neighborhood using GNSS as a synchronization reference. Moreover, functions for interference cancellation and interference coordination such as eICIC (enhanced Interference Cancellation and Interference Coordination) benefit from synchronization margins within +/−500 ns between cells in a given neighborhood. Other applications such as Offset Time Difference of Arrival (OTDOA) are used in some jurisdictions to comply with regulatory requirements for location services to meet an accuracy standard of +/−50 m that benefit from even more stringent synchronization accuracy.

Such synchronization accuracy is not achievable by means of the current RIBS function described above due to the lack of knowledge of the propagation delay from the synchronization source transmission point. A synchronization target eNB 500 m away from the synchronization source transmission point would already be subject to a synchronization error equal to the propagation delay from source to target of about 1.66 us. The delay may be even higher if the transmission path from source to target nodes is subject to multipath propagation. Such a mismatch would not meet TDD synchronization requirements and may degrade the performance of a number of functions that require more accurate synchronization.

In addition, for a multiple transmission point scenario, combined signals received by the synchronization target may not be received by the line of sight (LOS) signal of the closest TP. Either because there is no line of sight or because of different TP signal combining, the synchronization signal received at the synchronization target could be affected by a higher propagation delay than the LOS with the closest TP. Even if the geolocation coordinates of the synchronization source TPs are known at the target, the synchronization target eNB would not be able to compensate the exact propagation delays due to multipath combining. Indeed, the synchronization target may assume that the propagation delay is the one from the closest synchronization source's TP, which should provide the strongest signal. However, this may not be the case.

SUMMARY

Embodiments advantageously provide a method and system for wireless timing synchronization of a target node to a source node using a first radio signal transmission from the source node to the target node and a second radio signal transmission from the target node to the source node. In some embodiments, a clock offset for the target node is determined based on the radio signal transmission and reception times.

According to one aspect, a method is provided for wirelessly time synchronizing a target node with a source node. The method includes sending to the source node a request for time synchronizing the target node with the source node. The method further includes determining a first time, T1, indicative of a time of transmission of a first radio signal from the source node to the target node. The method further includes determining a second time, T2, indicative of a time of receipt of the first radio signal at the target node. The method further includes determining a third time, T3, indicative of a time of transmission of a second radio signal from the target node to the source node. The method further includes determining a fourth time, T4, indicative of a time of receipt of the second radio signal at the source node, and determining a clock offset based on the times T1, T2, T3 and T4 for use in time synchronizing the target node with the source node.

According to this aspect, in some embodiments, determining the clock offset comprises calculating the clock offset as a function of a round trip time expressed as (T4−T1)−(T3−T2). In some embodiments, determining the clock offset comprises calculating the clock offset as a function of an average of round trip times calculated for a plurality of first and second radio signals. In some embodiments, determining the clock offset comprises calculating the clock offset as one of [(T2−T1)−RTT/2] and [(T3−T4)+RTT/2], where RTT is a round trip time expressed as (T4−T1)−(T3−T2). In some embodiments, the method further includes adjusting a clock of the target node based on the clock offset determined. In some embodiments, each of the first and second radio signals comprises a downlink reference signal that is one of a position reference signal, PRS, a primary synchronization signal, PSS, and a secondary synchronization signal, SSS. In some embodiments, the first and second radio signals comprise periodic reference signals scheduled for transmission using common radio frequency resources. In some embodiments, the first and second radio signals comprise periodic reference signals, and the method further includes configuring second radio signal transmissions with a muting pattern such that the third time, T3, indicative of a time of transmission of the second radio signal from the target node to the source node does not overlap with the second time, T2, indicative of a time of receipt of the first radio signal at the target node. In some embodiments, the determining steps are performed at the target node, and the method further includes receiving the first radio signal from the source node at the first time, T1; and transmitting the second radio signal to the source node at the second time, T3. In some embodiments, the time T1 and the time T3 are determined based on a transmission schedule for the first and second radio signals. In some embodiments, determining the fourth time, T4 comprises receiving the time T4 from the source node via one of a direct and indirect interface. In some embodiments, the direct interface is an X2 interface and the indirect interface is an S1 interface. In some embodiments, the method further includes selecting the source node as a synchronization source node among a plurality of candidate synchronization source nodes based on an observed quality characteristic of one of a radio signal and a round trip time between each of the candidate synchronization source nodes and the target node. In some embodiments, the time synchronization information is received via one of an X2 or S1 interface. In some embodiments, at least one of the times T1, T2, T3 and T4 is defined at an Antenna Reference Point (ARP). In some embodiments, at least one of the times T1 and T4 is calibrated to compensate for a source node internal processing delay and wherein at least one of the times T2 and T3 is calibrated to compensate for a target node internal processing delay.

According to another aspect, a node is configured to wirelessly time synchronize a target node with a source node. The node includes a processor and a memory. The memory is configured to store instructions that, when executed by the processor, cause the node to: send to the source node a request for time synchronizing the target node with the source node; determine a first time, T1, indicative of a time of transmission of a first radio signal from the source node to the target node; determine a second time, T2, indicative of a time of receipt of the first radio signal at the target node; determine a third time, T3, indicative of a time of transmission of a second radio signal from the target node to the source node; determine a fourth time, T4, indicative of a time of receipt of the second radio signal at the source node; and determine a clock offset based on the times T1, T2, T3 and T4 for use in time synchronizing the target node with the source node.

According to this aspect, in some embodiments, to determine the clock offset, the instructions further cause the node to calculate the clock offset as a function of a round trip time expressed as (T4−T1)−(T3−T2). In some embodiments, to determine the clock offset, the instructions further cause the node to calculate the clock offset as a function of an average of round trip times calculated for a plurality of first and second radio signals. In some embodiments, to determine the clock offset, the instructions further cause the node to calculate the clock offset as one of [(T2−T1)−RTT/2] and [(T3−T4)+RTT/2], where RTT is a round trip time expressed as (T4−T1)−(T3−T2). In some embodiments, the instructions further cause the node to adjust a clock of the target node based on the clock offset determined. In some embodiments, each of the first and second radio signals comprises a downlink reference signal that is one of a position reference signal, PRS, a primary synchronization signal, PSS, and a secondary synchronization signal, SSS. In some embodiments, the first and second radio signals comprise periodic reference signals scheduled for transmission using common radio frequency resources. In some embodiments, the first and second radio signals comprise periodic reference signals, and the instructions further cause the node to configure second radio signal transmissions with a muting pattern such that the third time, T3, indicative of a time of transmission of the second radio signal from the target node to the source node does not overlap with the second time, T2, indicative of a time of receipt of the first radio signal at the target node. In some embodiments, the node comprises the target node and the instructions further cause the target node to: receive the first radio signal from the source node at the first time, T1; and transmit the second radio signal to the source node at the second time, T3. In some embodiments the time T1 and the time T3 are determined based on a transmission schedule for the first and second radio signals. In some embodiments, to determine the fourth time, T4, the instructions further cause the node to receive the time T4 from the source node via one of a direct and indirect interface. In some embodiments, the direct interface is an X2 interface and the indirect interface is an S1 interface. In some embodiments, the instructions further cause the node to select the source node as a synchronization source node among a plurality of candidate synchronization source nodes based on an observed quality characteristic of one of a radio signal and a round trip time between each of the candidate synchronization source nodes and the target node. In some embodiments, the time synchronization information is received via one of an X2 or S1 interface. In some embodiments, at least one of the times T1, T2, T3 and T4 is defined at an Antenna Reference Point (ARP). In some embodiments, at least one of the times T1 and T4 is calibrated to compensate for a source node internal processing delay and wherein at least one of the times T2 and T3 is calibrated to compensate for a target node internal processing delay.

According to another aspect, some embodiments include a non-transitory computer readable memory configured to store executable instructions that when executed by a processor, configure the processor to: send to the source node a request for time synchronizing the target node with the source node; determine a first time, T1, indicative of a time of transmission of a first radio signal from the source node to the target node; determine a second time, T2, indicative of a time of receipt of the first radio signal at the target node; determine a third time, T3, indicative of a time of transmission of a second radio signal from the target node to the source node; determine a fourth time, T4, indicative of a time of receipt of the second radio signal at the source node; and determine a clock offset based on the times T1, T2, T3 and T4 for use in time synchronizing the target node with the source node.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
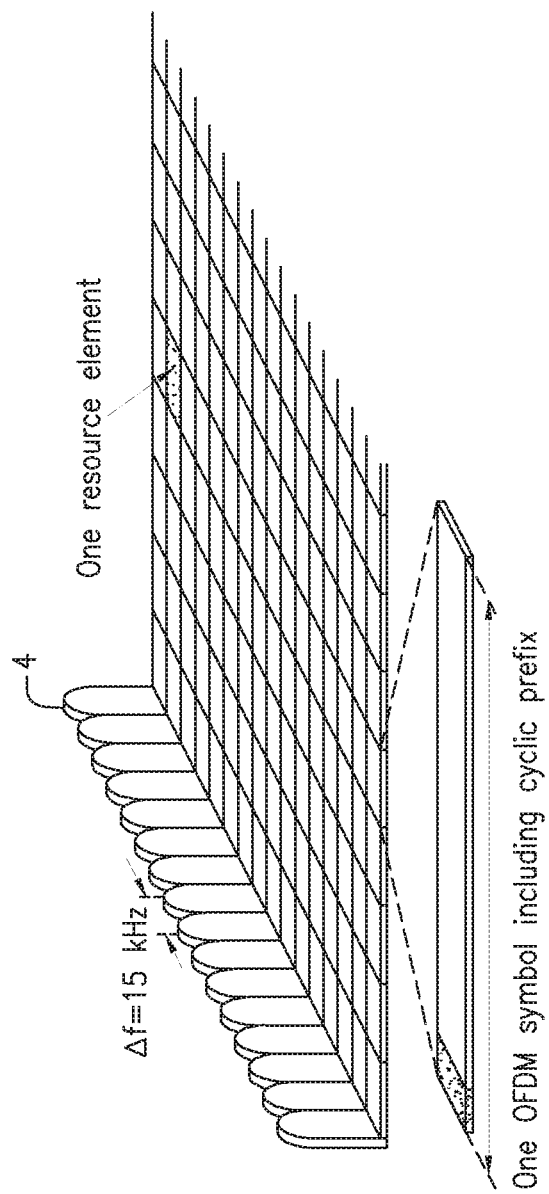
FIG. 1 is a diagram of a unit of one subcarrier and an OFDM symbol.
Figure 2:
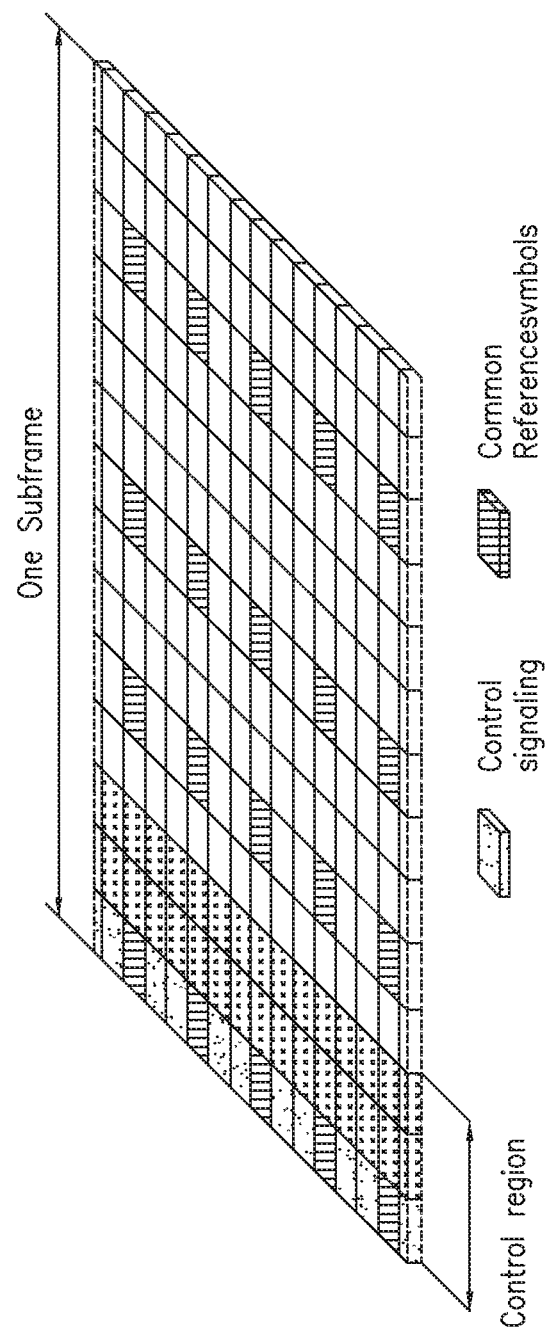
FIG. 2 is diagram of a subframe having reference symbols.
Figure 3:
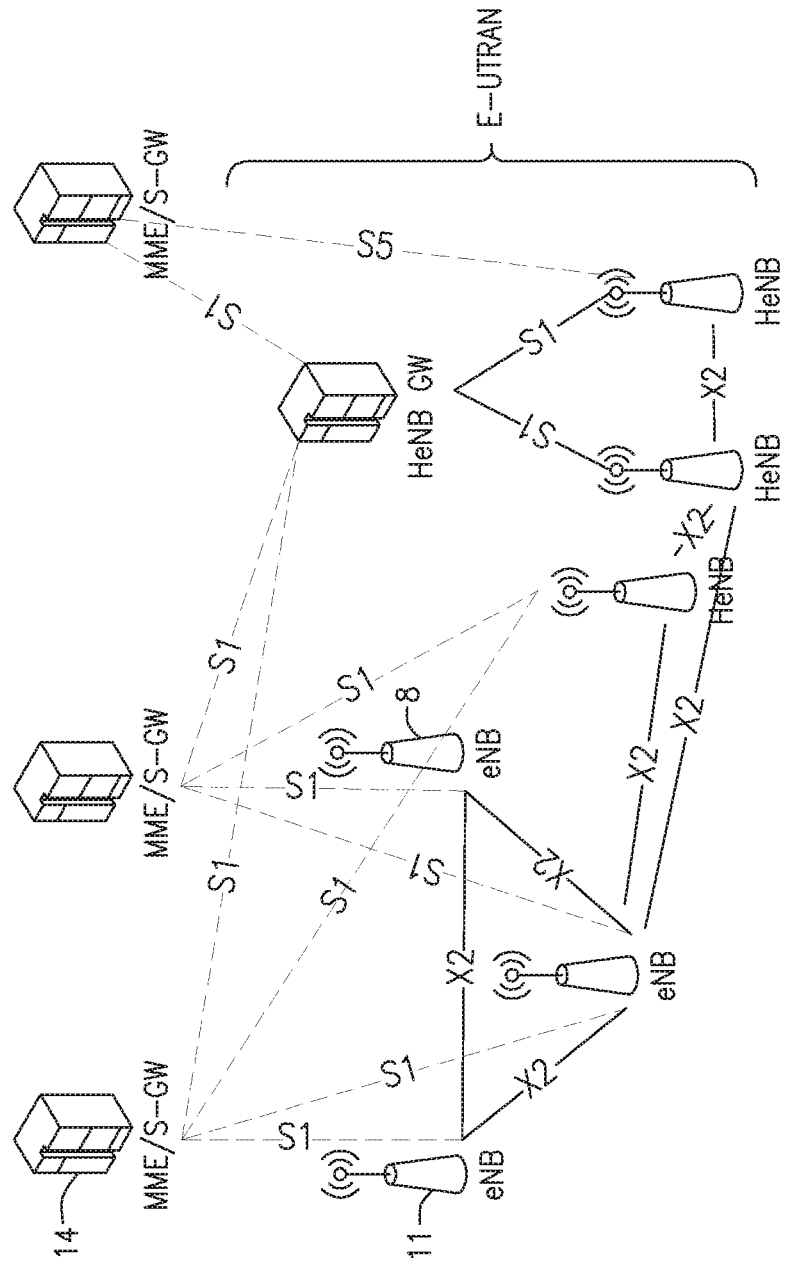
FIG. 3 is a diagram of a known communications network.

Before describing in detail exemplary embodiments that are in accordance with the present disclosure, it is noted that the embodiments reside primarily in combinations of apparatus components and processing steps related to synchronization of base stations in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Although terminology from 3GPP LTE has been used in this disclosure to describe some embodiments, this should not be seen as limiting the scope of the embodiments to only the aforementioned system. Other wireless systems, including not only WCDMA, WiMax, UMB and GSM, but also, other current or future 4G or 5G 3GPP networks, may also benefit from exploiting the subject matter covered within this disclosure.

Also note that terminology such as base station (or eNodeB) and mobile device (or UE) should be considering non-limiting and does not imply a certain hierarchical relation between elements; in general "base station" (or eNodeB) could be considered as device 1 and "mobile device (or UE) device 2, and these two devices may communicate with each other over some radio channel. Similarly, when talking about signaling over an X2 or an S1 interface, the solutions are not limited to communication between base stations, e.g., eNBs, or between a base station, e.g., eNB, and a Core Network (CN) but the communicating nodes can be any node terminating the interface over which the information described is transmitted.

Note that, in some embodiments, the procedures described herein may be employed to achieve synchronization between two base stations, between two mobile devices, e.g., UEs, or between a base station and a mobile device, e.g., UE. Thus, generally, synchronization can be achieved between two nodes, where a node can be a base station or a mobile device, e.g., UE. For example, the mobile device, e.g., UE, may be employed as a relay node between two base stations, between two mobile devices, e.g., UEs, or between a base station and a mobile device, e.g., UE.

According to some embodiments, synchronization between a source node and a target node is achieved by sending radio signals over the air between the nodes. As described herein, the source node provides the timing base to which the target node is to be synchronized.

Under this arrangement, the nodes, e.g., base stations, include receivers that monitor the downlink transmissions, e.g., a downlink reference signal, from other nodes, e.g., base stations, to extract the signal used for synchronization. Such an arrangement allows bidirectional measurement of signals to allow for synchronization. According to principles of the present disclosure, the target node clock is synchronized with a source node with a clock offset that compensates or takes into account the propagation delay from the source node to the target node which, as noted above, can have a substantial impact on the synchronization accuracy.

In some embodiments, the clock offset is determined based on the estimated round-trip propagation delay (also referred to as a Round-Trip Time or RTT) between the source and the target nodes. For example, the clock offset may be determined based on the transmission and reception times of a first radio signal transmitted from the source node to the second node as well as a second radio signal transmitted from the target node to the source node. In other embodiments, the clock offset is determined based on a "one-way" propagation delay (e.g., delay of the radio signal transmissions) which can be estimated by taking half of the estimated RTT between the source and the target nodes. With an estimated propagation delay, the clock offset can then be determined based the transmission/reception times associated with a given radio or reference signal between the source node and the target node, assuming substantially equal propagation time for both forward and return paths.

In some embodiments, the radio signals used for estimating the one-way propagation delay (or RTT) include periodic reference signals transmitted using common time and frequency resources. In that scenario, the reference signals may be configured with a muting pattern such that each of the source and target node can mute at least one of their reference signal transmissions to properly receive a reference signal transmission from the correspondent node with which synchronization is performed. Examples of suitable reference signals includes a new or existing reference signal such as a primary synchronization signal (PSS), a secondary synchronization signal (SSS) or a position reference signal (PRS), thereby providing an efficient means, both in terms of wireless and processing resources, to facilitate synchronization. Because signals such as the PSS, SSS and PRS are already accounted for and exist in the general sense in for example, the current LTE air interface, using these signals for synchronization as described herein does not add a further burden to the air interface. That said, the disclosure is not limited solely to the use of the PRS, PSS or SSS. The embodiments can be implemented using any suitable reference signal. For clarity, the embodiments described herein In some embodiments, the reference signals exchanged between source/target node pairs use the same frequency band in order to avoid asymmetry in propagation delay which contributes to propagation delay estimation error. In embodiments where the same periodic reference signals are used at the source and target nodes (e.g., PRS, PSS or SSS signals) it is desirable to avoid simultaneous transmission of both reference signals used to determine the propagation delay or RTT. This is because the nodes would have difficulty receiving one of the reference signal transmissions used while actively transmitting the other reference signal transmission. Hence it is beneficial to schedule the reference signal transmissions such that they are mutually orthogonal in the time domain between source/target node pairs (e.g., source/target transmits a reference signal during interval Tn and receives a reference signal from a target/source during interval Tm, where Tn and Tm are different or do not overlap).

In some embodiments where PRS signals are used, scheduling flexibility of the PRS is particularly advantageous for this purpose since a muting pattern can be configured at both the source and target nodes or at all nodes in a particular area or neighborhood such that time domain orthogonality is universally achieved for all source/target node pairs in the neighborhood. Without muting configured, a node supporting PRS transmits its PRS on every PRS occasion which is configured to have periodicity of 160, 320, 640 or 1280 ms. With PRS muting configured, a node transmits only during a subset of the configured PRS occasions according to the PRS muting information bits which indicate the active PRS occasions in a 2, 4, 8 or 16 bit cycle (i.e., bit equal to 0 when PRS is muted). In one example, each of the source and target nodes is configured to mute at least one PRS occasion during which it can receive a reference signal transmission used for synchronization. It is understood that in implementations where it is desirable to average the propagation delay over multiple measurements (i.e., using multiple sets of PRS transmissions), a corresponding number of PRS occasions would need to be muted. Generally, the number of muted PRS occasions at each node is a function of the number of propagation measurements required. By achieving a coarse degree of time-synchronization prior to becoming active transmitters, nodes involved in a synchronization procedure as described herein are able to achieve time domain orthogonality of their respective PRS transmissions using the appropriate PRS muting configuration. In implementations where muting is used, there is no need to trigger or coordinate individual PRS transmissions since these would occur autonomously as dictated by the PRS configuration used at each node. It is to be understood that the present disclosure is not limited to PRS signals and generally, any signal that are configured to achieve mutual orthogonality in the time domain (for e.g., with periodicity and mutability) can be used.

In some embodiments, a target node (e.g., a first base station) synchronizes with a source node (a second base station) by calculating a clock offset based on the transmission and reception times of two reference signals. In one example, a first message (e.g., a first reference signal) is generated and sent over the air from the source node to the target node. At the time of sending such message a time stamp indicative of a time of transmission of the first message is generated by the source node and sent to the target node. Such timestamp is referred to herein as a first timestamp, T1. Alternatively, the time, T1, of transmission of the first message can be ascertained independently by the target node based on a known or predetermined transmission schedule for the messages used. At the time of reception of the first message at the target node, a new timestamp is generated by the target node, referred to herein as a second timestamp, T2. Similarly, the target node generates a second message (e.g. a second reference signal) over the air interface towards the source node.

Figure 7:
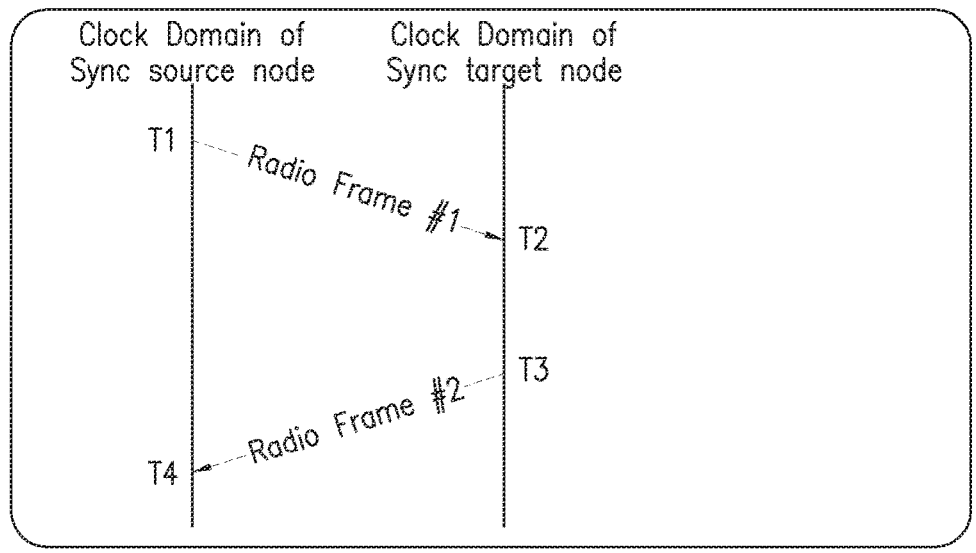
FIG. 7 is a signaling diagram for exchanging radio signals having time stamps.

At the time this second message is sent, a third timestamp is generated by the target node, referred to herein as the third timestamp, T3. Alternatively, and similarly to the first timestamp, T1, the time, T3, of transmission of the second message can be ascertained by the target node independently from a known or predetermined transmission schedule for the messages used. Finally, at the time the second message is received by the source node, a fourth time stamp will be generated by the source node, referred to herein as the fourth timestamp, T4. The naming of T1, T2, T3 and T4 and source and target node is shown in FIG. 7, wherein the first message is shown represented by radio frame #1, and the second message is shown represented by radio frame #2. It can be appreciated that the node initiating the synchronization procedure described herein may be the source node or the target node. In the example embodiment of FIG. 7, the source node has been chosen to initiate the procedure.

It is important to note that the order in which the first and second messages are transmitted can vary. In some embodiments such as shown in FIG. 7, the first message is transmitted before the second message. In other embodiments, the first message is transmitted after the second message. In yet other embodiments, the messages are transmitted concurrently but are non-overlapping in time at each node. Generally, to the extent each of the source and target nodes can properly determine the transmission and reception times T1, T2, T3, T4 (e.g., with appropriate muting patterns and/or transmission times configured such that each nodes does not simultaneously transmit and receive at the same time or such that the first and second messages are scheduled as non-overlapping transmissions at each node), the order in which the first and second messages are transmitted can vary. In some embodiments, the node that generated T1 and T4 (in this example the source node) signals such timestamps to the node that generated T2 and T3 (in this example the target node) via a direct or indirect interface. In some examples, T1 and T4 are sent over the air, e.g., encoded in a radio or reference signal transmission to the target node. In other examples, T1 and T4 are sent via a direct source node-to-target node interface (e.g., an X2 interface) or indirectly via an intermediate node (e.g., an MME node) and/or interface (e.g., an S1 interface). With the T1 and T4 information, the target node generating T2 and T3 can therefore calculate a clock offset (defined as the difference between the target node clock and the source node clock) as a function of the times T1, T2, T3, T4.

There are many ways in which the target node may calculate the clock offset based on the times T1, T2, T3, T4. In one example, the clock offset is calculated as a function of a round trip time or RTT expressed as (T4−T1)−(T3−T2). In another example, the clock offset is calculated as a function of the one-way propagation delay (e.g., delay of the radio signal transmissions) which, as noted above, can be estimated by taking half of the estimated RTT between the source and the target nodes. In yet another example, the clock offset is calculated as either [(T2−T1)−RTT/2] or [(T3−T4)+RTT/2]. Other implementations are possible.

Figure 8:
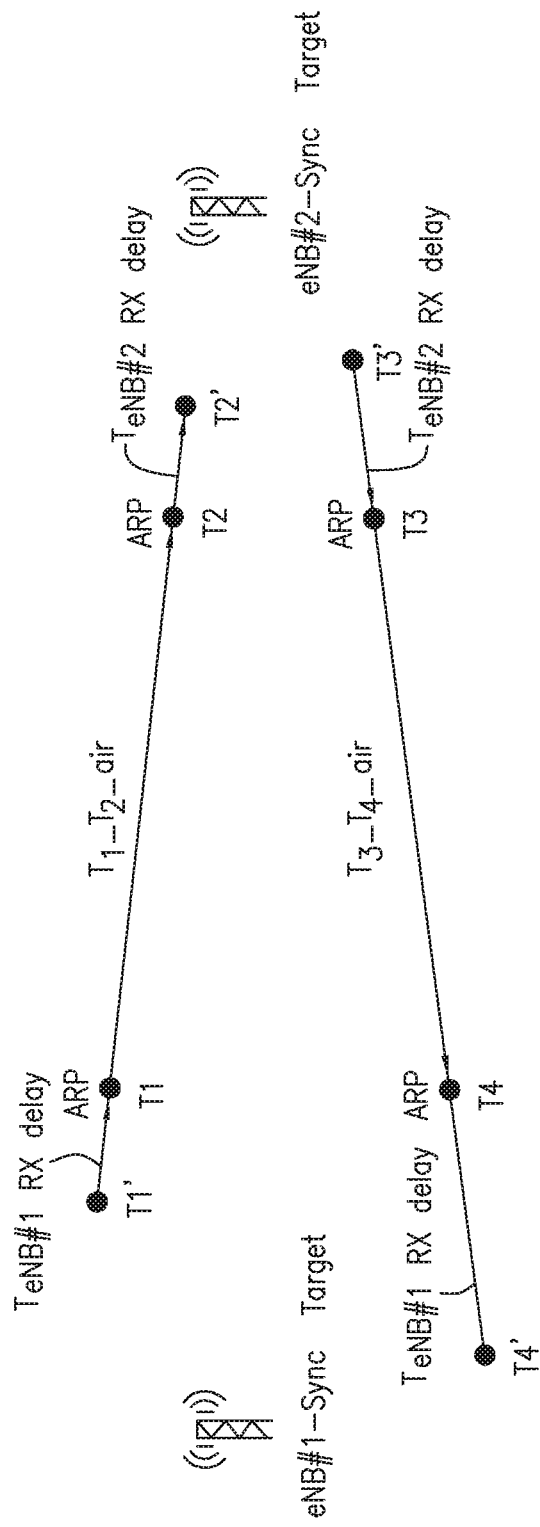
FIG. 8 is a signaling diagram for exchanging radio signals having time stamps, where the internal time delays are taken into account.

To improve synchronization accuracy, the clock offset should also compensate for internal delays and variations in the transmit and receive paths of the source and target nodes. Since internal delays are properties which are dependent on the node design, the source and target nodes keep track and compensates for internal delays and variations. Depending on the node design and the synchronization accuracy required, different compensation methods could be used. FIG. 8 shows one example of such compensation for synchronizing eNBs in an LTE network. In FIG. 8, the time stamps for T1, T2, T3 and T4 are defined or determined at an Antenna Reference Point (ARP). This approach is particularly well suited for LTE which requires deterministic handling of the timing of signals at the ARP, and hence careful handling of timing uncertainty of the data path from baseband to ARP for transmit signals and from ARP to baseband for receive signals. By defining the times T1, T2, T3 and T4 in relation to the nodes' ARPs instead of a different point within the nodes (for example, baseband defined T1', T2', T3', T4'—described further below in relation to FIGS. 9 and 10), the propagation delay (or RTT) is effectively calibrated for possible variations in and between the transmit and receive paths.

Another way could be that compensation data indicative of the source node delay is sent to the target node (together with the time stamps T1, T4 or in separate transmissions) so that the target node calculates its clock offset also as a function of its own compensation data and the compensation data received. But other possibilities exist as internal delays and variations are dependent on the node design chosen. As such, the compensation method used may vary. The compensation can, e.g., be based on characterization or calibration of internal delays close to or during actual round trip time measurement, to avoid or reduce variations over time.

As noted above, in some embodiments, the time message to stamp is the radio frame which is a base band IQ frame containing a reference signal such as a primary synchronization signal (PSS), a secondary synchronization signal (SSS) or a position reference signal (PRS). The time stamp may be applied to the reference signal before the up conversion to the radio frequency for the downlink and after the down conversion from radio frequency to base band in the uplink. The base band processor of each node may derive the position of the reference signal relative to the start of the time stamped radio frame. Note that in some embodiments, a radio signal transmitted between two nodes to achieve timing synchronization can be a reference signal, e.g., PSS/SSS/PRS.

Figure 9:
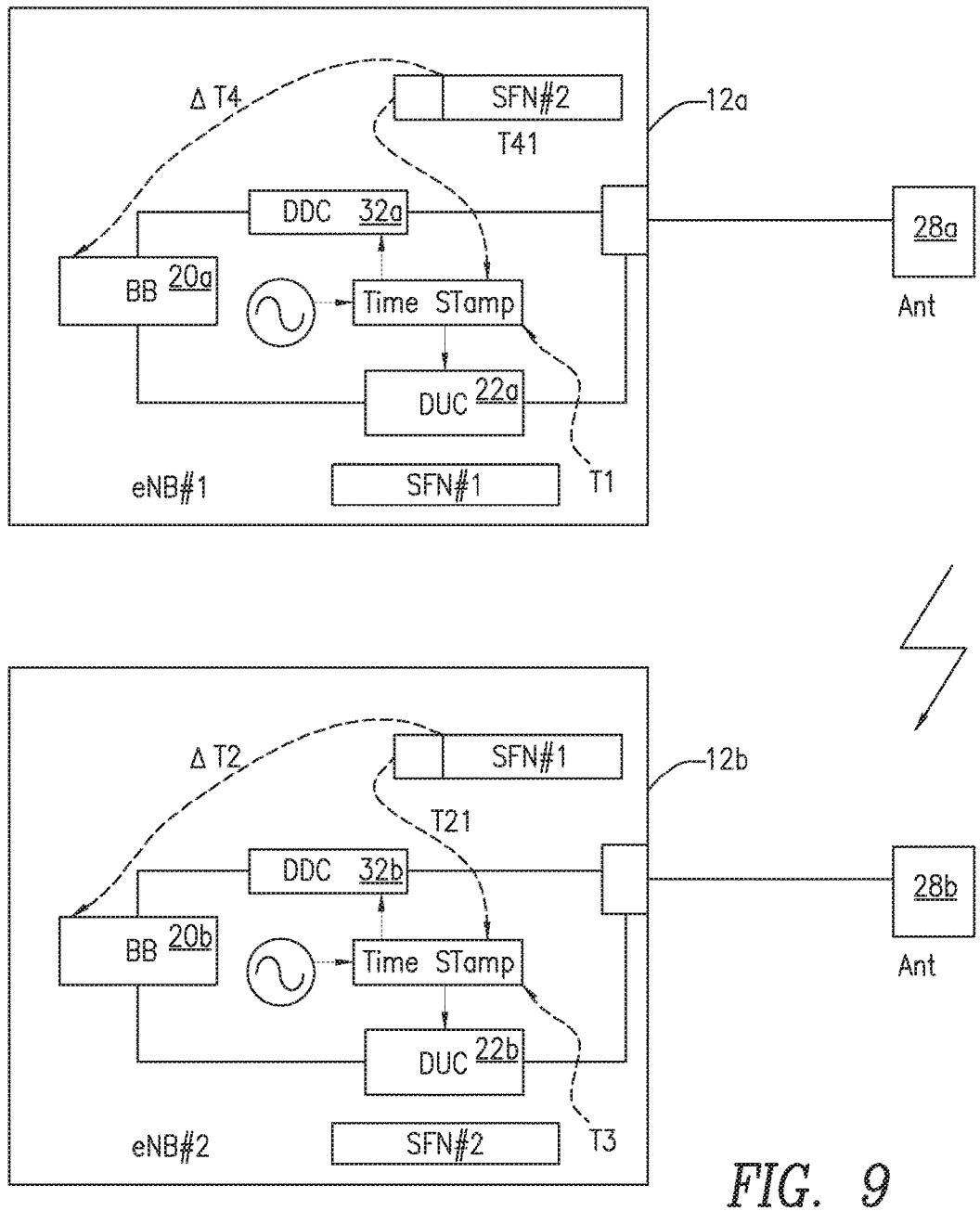
FIG. 9 is a block diagram of base stations with internal timing used to generate time stamps.
Figure 10:
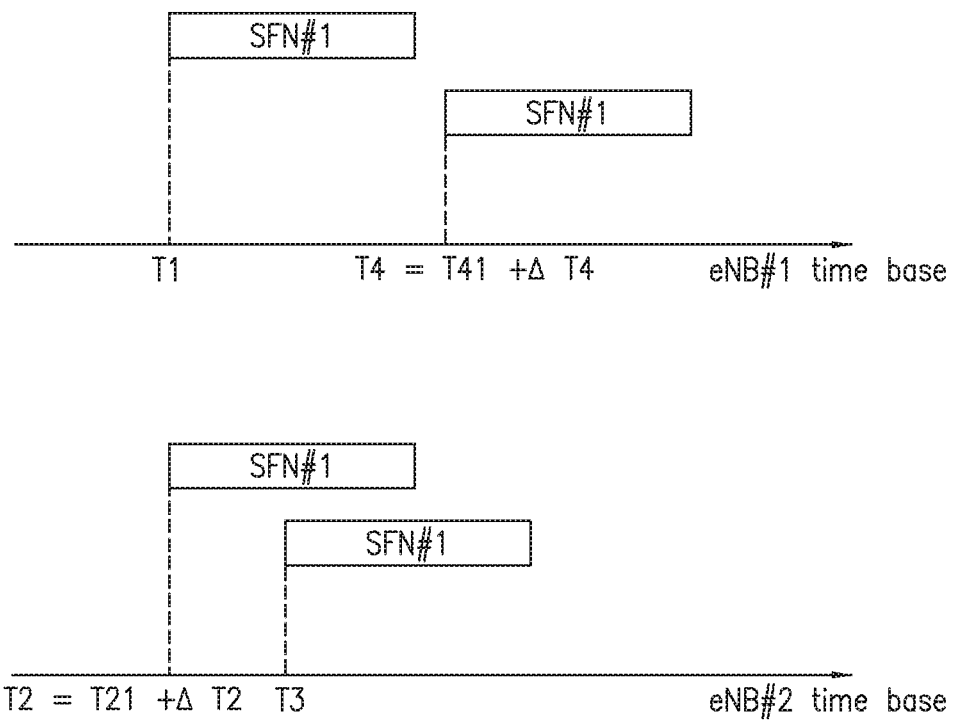
FIG. 10 is a timing diagram that shows the time stamp times for each base station.

For example, referring to FIGS. 9 and 10, from source node 12a to target node 12b, the time stamp T21 is performed by time measurement at two places, one for the IQ stream at the DDC 32b (digital down conversion) of the target node 12b which is responsible to convert the RF signal to baseband signal. The other is ΔT2 at the base band processor 20*b* which processes the IQ data and identifies the start position of the reference signal (PRS/PSS/SSS). Finally, T2 is derived by adding T21 and ΔT2. Similarly from target node 12*b* to source node 12*a*, T4 is derived by adding T41 and ΔT4, where T41 is measured at the DDC 32*a* of the source node 12*a* and ΔT4 is measured at the base band processor 20*a*.

In some embodiments, the message containing time stamp information can be transferred over the S1 interface. In some embodiments, the message containing time stamp information can be transferred over the X2 interface. In some embodiments, the message containing time stamp information and configuration can be transferred over the OSS interface.

In some embodiments, the target node and source node can be synchronized with the help of an intermediate node. The intermediate node will provide the time stamp measurement to both the source node and the target node with or without itself being synchronized to either target node or source node. Of note, a node such as a base station can be both a source node and target node in that the node can be a target node configured to synchronize with a first (source) node and can also be configured to serve as a synchronization source to a second node.

Figure 11:
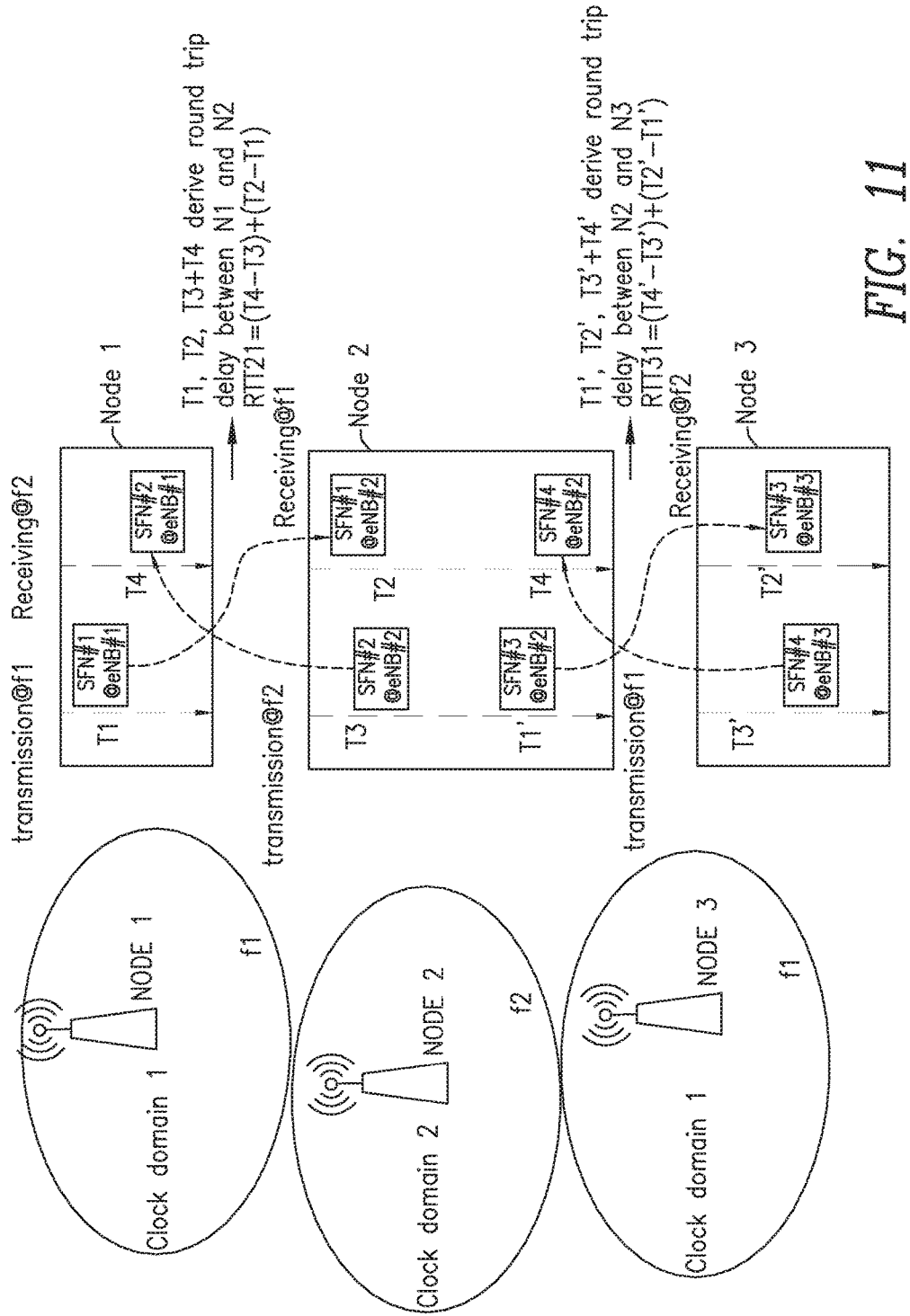
FIG. 11 is an illustration of exchanging timing via an intermediate base station.

As shown in FIG. 11, the node 3 as target node should synchronize to the node 1 as a source node. However, the received power from the source node 1 may be weak, whereas the signal from an intermediate node 2 may be much stronger. Since the intermediate node 2 is operating on another frequency than source node 1 and target node 3, the clock from the source node 1 is preferred to be relayed from the intermediate node 2 to the target node 3. The intermediate node 2 can, in this case, exchange time stamp messages with the source node 1 and the target node 3 separately. By doing so, T1, T2, T3 and T4 can derive the round trip time RTT21 between source node 1 and intermediate node 2. The same procedure can be applied to intermediate node 2 and target node 3. The round trip time RTT32 between intermediate node 2 and target node 3 can be derived in the same way as T1', T2', T3' and T4' is measured. Note that the method of using an intermediate node may be advantageous even when the intermediate node is synchronized.

Figure 12:
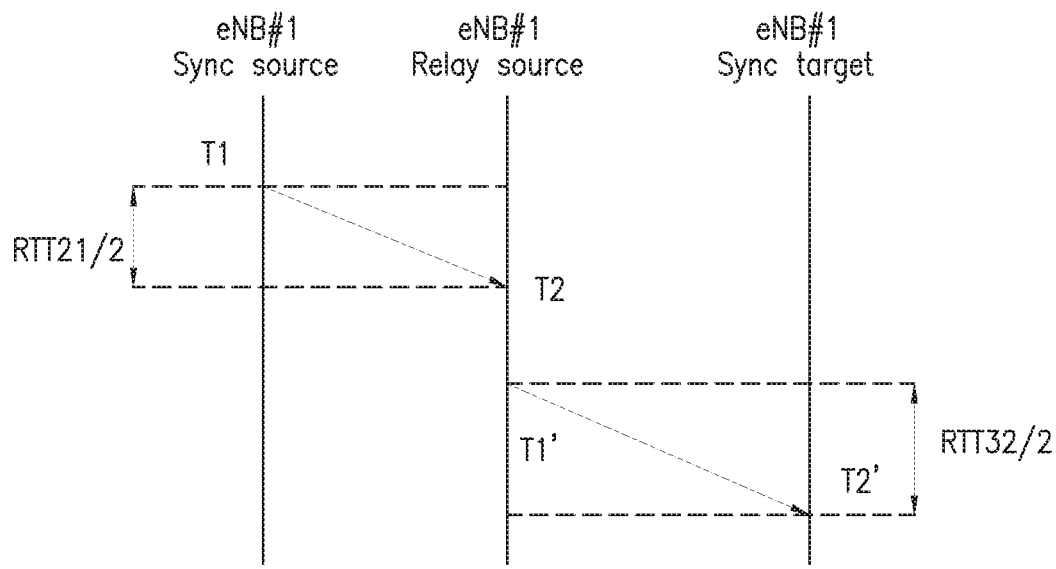
FIG. 12 is a timing diagram in the presence of an intermediate base station.
Figure 6:
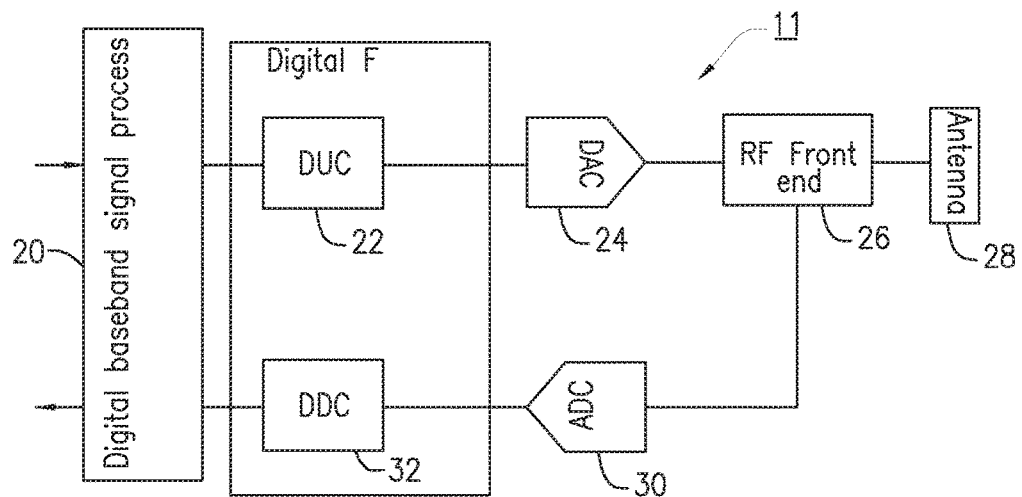
FIG. 6 is a block diagram of a base station.

Once the round trip times RTT12 and RTT32 are known, the time offset between the source node 1 and the target node 3 can be derived as shown in FIG. 12. The time offset can be computed as follows:

Time offset=$T2'-(T1+RTT21/2+T1'-T2+RTT32/2)$

The method described can be extended to several intermediate nodes.

In some implementations, the target node begins the synchronization procedure by first selecting the best source node and exchanging synchronization information to facilitate synchronization. In one implementation, the source node selection is performed according to messages 1 to 4 in FIG. 4. In that example, the eNB1 11*a* (a target node in this example) generates an eNB Configuration Transfer message containing a SON Information Transfer IE with a SON Information Request IE set to "Time synchronization Info". In message 2 the MME 14 receiving the eNB Configuration Transfer message forwards the SON Information Transfer IE towards a candidate eNB2 11*b* indicated in the IE by means of the MME Configuration Transfer message. The receiving eNB2 11*b* may reply in message 3 with an eNB Configuration Transfer message towards the eNB1 11*a* including a SON Information Reply IE with the Timing Synchronization Information IE, which includes eNB 11*b*'s Stratum Level and a Synchronization Status (additionally the message can include information about availability of the muting function and details of already active muting patterns). The MME 14 receiving the eNB Configuration Transfer message from eNB2 11*b* forwards it to eNB 1 12*a* in message 4 by means of the MME Configuration Transfer message. When the procedure outlined by messages 1 to 4 of FIG. 4 is carried out with a sufficient number of neighboring eNBs (e.g., eNB2 11*b* and eNB3 11*c*), the eNB1 11*a* is able to select the best source node for synchronisation based on the Timing Synchronisation Information received from each candidate eNB (e.g., eNB2 11*b* and eNB3 11*c*).

Figure 4:
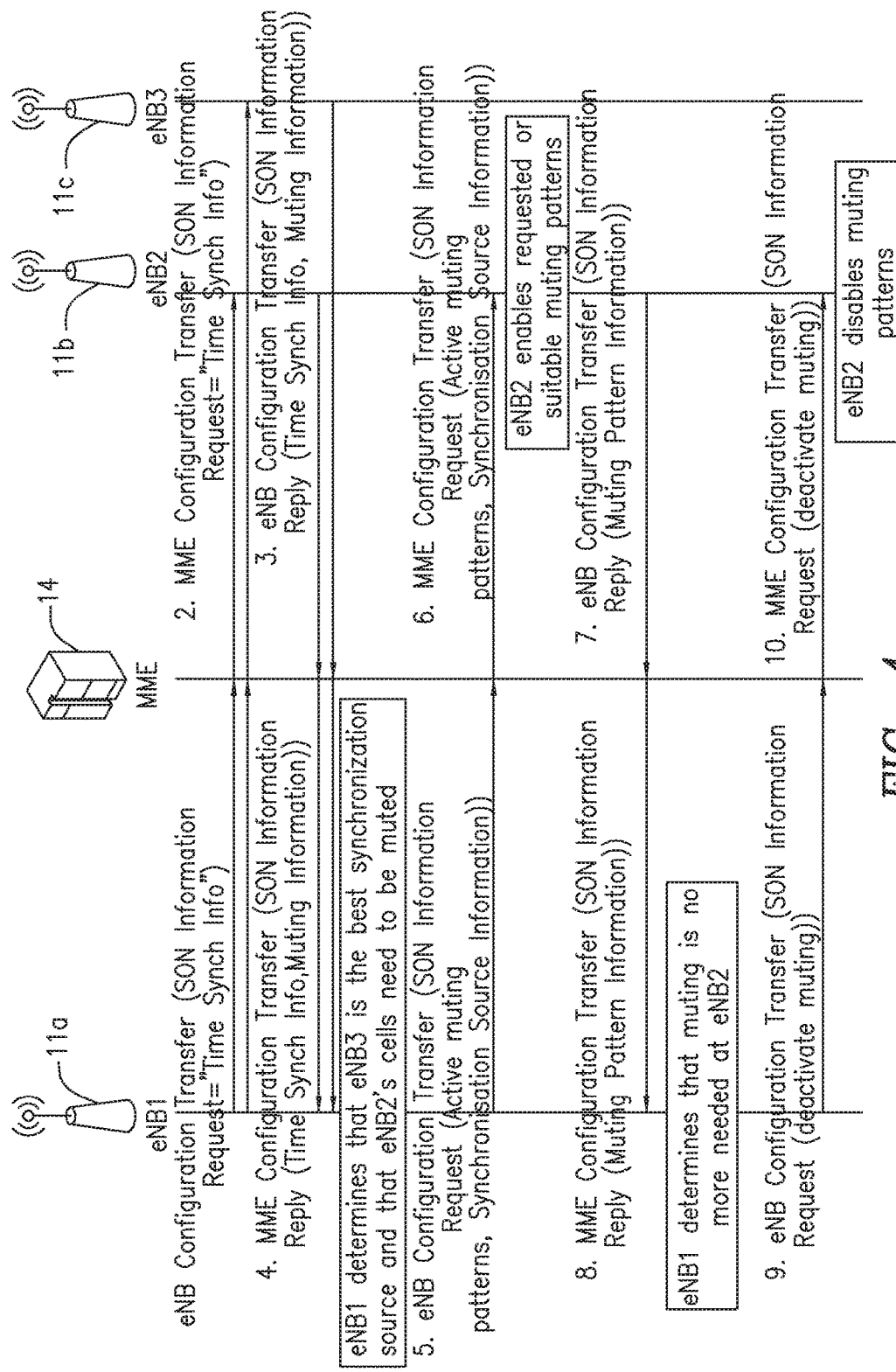
FIG. 4 is a signaling diagram for exchange of timing synchronization between base stations.
Figure 5:
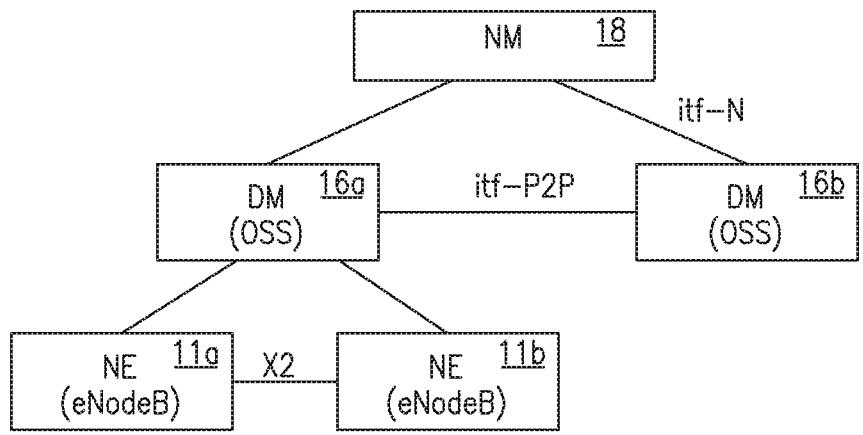
FIG. 5. is a block diagram of a network management system.

The procedure shown in FIG. 4 is an example of the Radio Interface Based Synchronization (RIBS) functions standardized in 3GPP Release 12 which, is considered to provide coarse or basic synchronization with a selected source node. In some embodiments, the present disclosure seeks to further improve the synchronization accuracy achieved by such conventional synchronization techniques by further adjusting the target node clock offset to compensate for the propagation delay (or RTT) observed from the source node to the target node. According to principles of the present disclosure, in some embodiments, the propagation delay estimation procedure is performed after the target node has selected and/or exchanged synchronization information with a source node for synchronization.

In relation to synchronization procedure shown in FIG. 4 for example, example, once a source node for synchronisation has been selected (e.g., eNB2 11*b*), the target node eNB (e.g., eNB1 11*a*) may start the synchronization procedure described above which uses transmission and reception times of reference signals to calculate a clock offset that compensates for the propagation delay between the target node and the source node. The synchronization procedure may start once the source node has been selected, either before or after procedures to request muting of neighbour interfering nodes is carried out.

In another example, the target eNB is configured to estimate the RTT with a plurality of candidate source eNBs to help determine the best candidate source eNB with which to synchronize. Even if the candidate eNBs are equally distanced from the target eNB, the RTT for each candidate course eNB (for example with the same neighbouring eNBs with which messages 1 to 4 of FIG. 4 were exchanged) may differ due to over the air propagation variations. In some embodiments, the target eNB is configured to select the best candidate source node based at least in part the propagation delay (or RTT) estimated as described herein or based on a quality characteristic of the propagation delay estimate or of a reference signal used to estimate the propagation delay (or RTT). Such quality characteristic may include a Signal-to-Noise Ratio (SNR), a Signal-to-Interference-plus-Noise Ratio (SINR) or a signal strength of the first reference signal (e.g., the reference signal received from each candidate source node), a variability of times T2 and/or T4. In other implementations, the target node selects a candidate source node based on the best Signal-to-Noise Ratio (SNR) of reference signals used to estimate the RTT and/or based on the most stable RTT (e.g., when multiple RTT measurements are used).

Once the source node selection is completed, the target node sends a request to the source node to estimate the propagation delay (or RTT) for determining the proper clock offset for synchronization. Such a request may consist of a message over a common interface connecting source node and target node directly or indirectly. For example, the X2 interface can be used for direct communication between source node and target node, while such request could be indirectly conveyed over the S1 interface using an eNB Configuration Transfer message from a target node eNB to MME and over the S1 interface using a MME Configuration Transfer message from MME to a source node eNB.

In another example, the message requesting the start of a synchronization procedure may contain information about the timing when the source node sends a message over the air and about the timing when the target node sends a message over the air. For example, the message could specify that the source node shall send a message over the air at the beginning of a given Radio Frame identified by a System Frame Number (SFN), for example SFN=1. The message could also specify that the target node will send a message over the air at the start of one of its own Radio Frames identified by an SFN, for example SFN=2.

In another example, the synchronization procedure may calculate an RTT estimate based on the average of several RTT measurements and hereby mitigate the stochastic contribution of noise in a single measurement. Several measurements should be made to get better statistics for RTT compensation. This could be done more periodically, initially more frequently, and subsequently less frequently with filtering based on historical data. In some embodiments, unexpected trends could trigger the need for more frequent measurements and/or indicate uncertainty in the measurements.

In another example, beamforming can be used both at the source and at the target nodes to create a more deterministic propagation path for both the first and second reference signals used for RTT measurements. In some embodiments, the beamforming can be employed to reduce both propagation delay variation and propagation delay asymmetry between the reference signals used.

Figure 13:
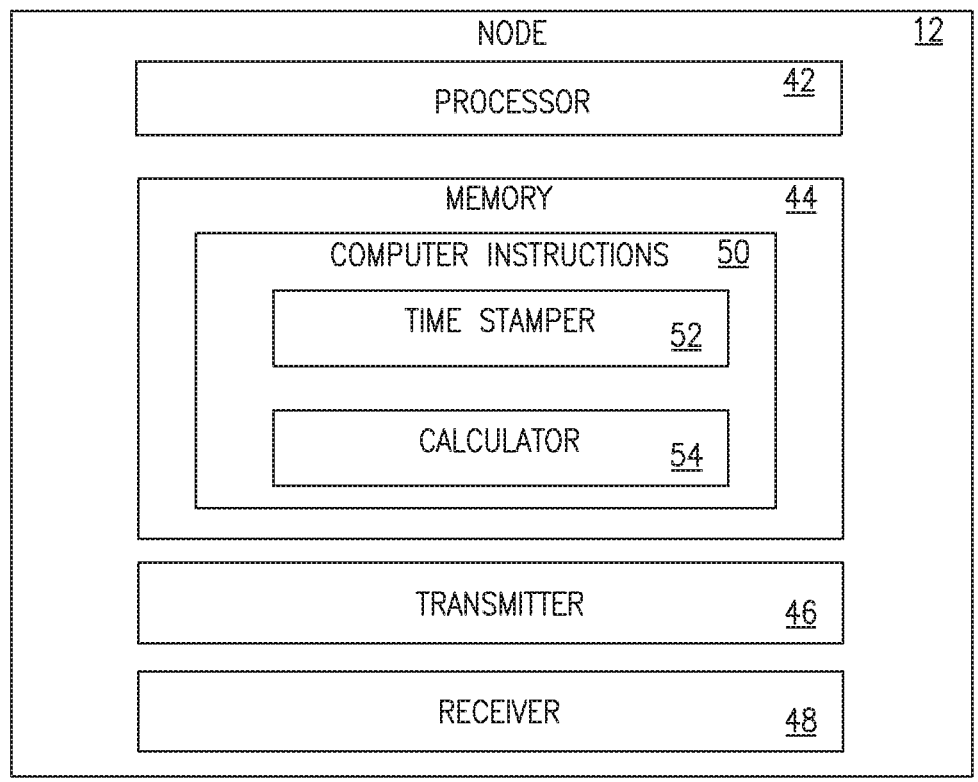
FIG. 13 is a block diagram of an embodiment of a base station constructed as described herein.

FIG. 13 is a block diagram of a node 12 that can be configured to synchronize timing with another node. The node 12 can be configured to be a source node and/or a target node. The node 12 includes a processor 42, a memory 44, a transmitter 46 and a receiver 48. The memory 44 includes computer instructions 50 that, when executed by the processor 42, configure the processor 42 to perform time stamping functions 52, as described above, and to calculate 54 a propagation time (or RTT) based on the time stamps.

In one embodiment, where the node 12 is the target node, the memory 44 stores instructions that, when executed by the processor 42 configures the processor 42 to determine a first time T1, of transmission of a first radio signal from the source node. The processor 42 is also configured to determine a second time, T2, indicative of a time of receipt of the first radio signal. The processor 42 is also configured to determine a third time T3, indicative of a time of transmitting a second radio signal. T1, T2 and T3 are, in conjunction with T4 (determined by the source node), used to time synchronize the target node with the source node. When the node 12 acts as a target node, the transmitter 46 is configured to transmit a request to the source node to start a round trip time estimate and transmit the second radio signal to the source node. Also, when the node 12 acts as a target node, the receiver 48 is configured to receive the first radio signal and receive T4 from the source node.

In one embodiment, where the node 12 is the source node, e.g., source base station, the transmitter 46 is configured to transmit T4 and optionally T1, to a target node or a centralized server, and the receiver 28 is configured to receive from the target node a return message over the air. The return message may be, optionally, a time stamped radio frame time stamped with a time, T2, of receipt of the first time stamped radio frame at the target base station and a third time stamped with a time, T3, of transmission of the return message by the target node. Or the return message may otherwise indicate that it is in response to receiving at the target node a previous message received from the source node. The receiver 28 is configured to monitor and receive downlink or uplink radio reference signals, i.e., over the air, transmissions from other nodes, including the PRS, PSS and SSS. The receiver 28 can be integrated with or separate from the receiver used to receive uplink radio transmissions from mobile devices.

Note further that the times T1, T2, T3, T4 may be sent to a central node that calculates the round-trip propagation time as (T4−T1)−(T3−T2). In some embodiments, assuming that the central node can uniquely associate the transmission/ reception times T1, T2, T3 and T4 with the appropriate reference signals used for the RTT estimation, instead of conveying T2 and T3 as individual values to the central node, the target node can convey the time information determined in the form of a time interval between reception of the first reference signal and transmission of the second reference signal (e.g., expressed as T3−T2. Similarly, the source node can convey the time information determined at its end in the form of time interval between the transmission of the first reference signal and the reception of the second reference signal (e.g., expressed as T4−T1). A benefit of this approach is that the same resolution can be conveyed with fewer information bits. Also note that in some embodiments, the times T1, and/or T3 may be ascertained from a schedule of transmissions for the reference signals and thus need not be sent to the central node. Note also, that in some embodiments, the times T2 and T3 are not sent from the target node to the source node. Note further, that time stamps may be sent separately from reference signals used for the RTT estimation.

Figure 14:
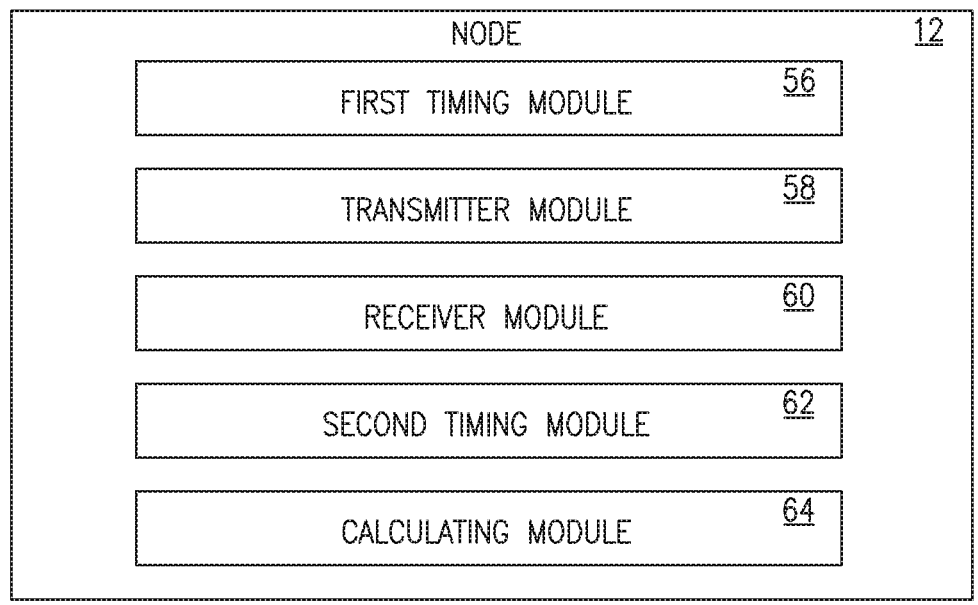
FIG. 14 is a block diagram of an alternative embodiment of a base station constructed as described herein.

FIG. 14 is a block diagram of an alternative configuration of a node 12 that may function as a source node or a target node. The configuration of FIG. 14 may be implemented by storing software modules that may be executed by a processor. When acting as the target node, the transmitter module 58 causes transmission of a request to the source node to start a synchronization procedure. A first timing module 56 determines the times T2 and T3, each respectively indicating a time of receipt of a first radio signal at the target node and a time of transmission of a second radio signal to the source node. The transmitter module 58 also causes the transmission the second radio signal to the source node. The receiver module 60 receives the first radio signal from the source node and receives the time T4 and optionally the time T1 from the source node. Based on the time information received by the receiver, the second timing module 62 determines the time T1 and T4. Alternatively, the time T1 and/or T3 may be determined based on a known or predetermined schedule of signal transmissions. A control module 64 is configured to calculate the clock offset based on T1, T2, T3 and T4. The control module 64 may further adjust the timing of the target node to achieve timing synchronization, as noted above, based on the clock offset calculated in combination with either T1, T2 or T3, T4.

When acting as a source node, the node 12 has a first timing module 56 configured to determine a first time T1, indicating a time of transmitting a first radio signal to a target node and to determine the time T4, indicated a time of receipt of a second radio signal from the target node. A transmitter module 58 is configured to transmit the first radio signal and to transmit T4 (indicating a time of receipt of a second radio signal from the target node), and optionally T1, to the target node. A receiver module 60 is configured to receive the second radio signal from the target node and optionally T2 and T3 from the target node. If the source node 12 is configured to determine the target node clock offset, the source node 12 includes optionally a second timing module 62 configured to determine the times T2, T3 each respectively indicating a time of receipt of the first radio signal at the target node and a time of transmission of the second radio signal from the target node to the source node. In that scenario, the source node may optionally include a control module 64 to calculate the clock offset for the target node based on T1, T2, T3 and T4 which may be sent to the target node via the transmitter module 58 for adjusting the timing of the target node clock.

In accordance with another embodiment, a centralized server can be configured to handle conveyance of observed timestamps to appropriate target nodes. Also, the centralized server can be configured to gather and convey a subset of the total potential relevant timestamps to a target node as needed to maintain adequate synchronization in order to conserve signaling capacity.

The modules shown in FIG. 14 may be implemented at least partially in the memory 44 in the form of software or computer-implemented instructions executed by the processor 42 within the node 12 or distributed across two or more nodes, e.g., the node 12 and another node. In another example, the processor 42 may include one or more hardware components such as application specific integrated circuits (ASICs) that provide some or all of the functionality described above. In another embodiment, the processor 42 may include one or more hardware components, e.g., Central Processing Units (CPUs), and some or all of the functionality described above is implemented in software stored in, e.g., the memory 44 and executed by the processor 42. In yet another embodiment, the processor 42 and memory 44 form processing means (not shown) configured to perform the functionality described above.

Figure 15:
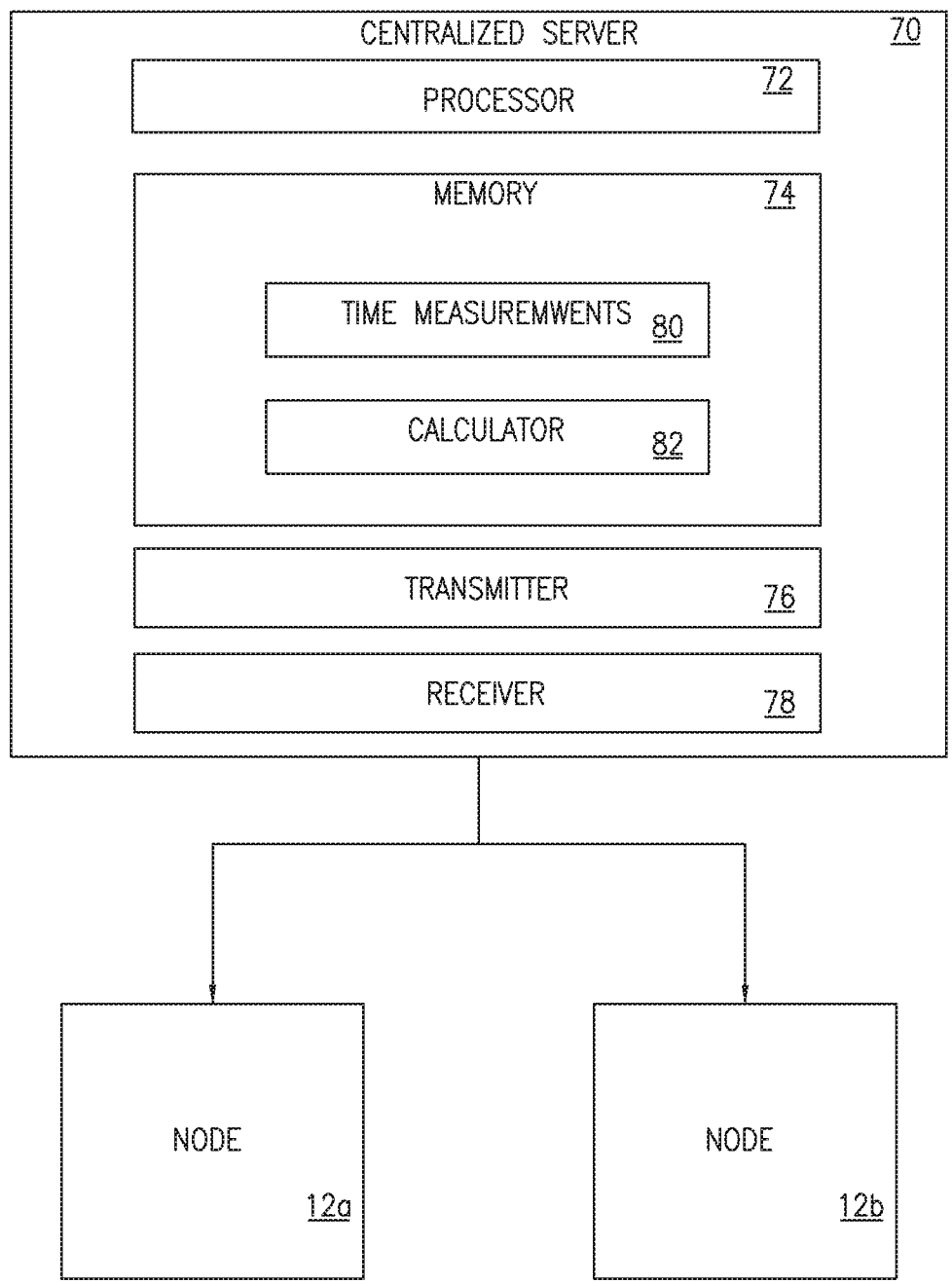
FIG. 15 is a block diagram of a centralized server configured to facilitate synchronization between a source node and at least one target node.

FIG. 15 is a block diagram of an embodiment of a network with a centralized server 70 in communication with a source node 12a and at least one target node 12b. The centralized server 70 includes a processor 72, a memory 74, a transmitter 76 and a receiver 78. The processor 72 is configured to execute computer instructions stored in the memory 74. The memory 74 may be organized into modules that include storage of time measurements 80 and a calculator module 82 for instructing the processor to compute and/or store the time measurements 80.

The time measurements may be received from a source node and a target node via the receiver 78 automatically and periodically or in response to a request sent to the target and/or source nodes via the transmitter 76. The time measurements can be the values, T1–T4, or alternatively, they may be time intervals T4–T3, T2–T1, T4–T1 and/or T3–T2. In operation, the centralized server 70, the source node 12a or one or more of the target nodes 12b may initiate a synchronization procedure based on RTT estimation) by sending a signal to another node such as the centralized server 70.

In one embodiment, upon receipt of a request from a node 12, or automatically and periodically, the centralized server 70 may initiate a RTT measurement process by causing the source node 12a to send a first radio message to one or more of the target nodes 12b. The time T1 at which the first radio message is sent to a target node 12b may be known a priori by the centralized server 70 or may be received from the source node 12a. The time, T2, at which the first radio message is received at a target node 12b may be sent to the centralized server 70. The time T3 at which a target node 12b transmits a second radio signal, is either sent to the centralized server 70 or predetermined at the centralized server 70 and corresponding scheduling information is sent to the target node 12b in time for the transmission of the second radio signal at T3. After the second radio signal transmitted at time T3 is received by the source node 12a at time T4, the time T4 is transmitted to the centralized server 70 from the source node 12a. Note that an alternative embodiment of the centralized server 70 can be implemented as software modules that when executed by the processor perform the functions described herein.

Each of the node 12 and the centralized server 70 includes a transmitter and receiver and circuitry containing computer-implemented instructions which when executed by one or more processors cause their respective node 12 and centralized server 70 to perform some or all of the functionality described above. In yet another variant, the circuitry includes the respective memories and processor(s) which may be implemented in many different ways. In one example, the memories contain instructions which, when executed, cause the respective node 12 and centralized server 70 to perform some or all of the functionality described above. Other implementations are possible.

Figure 16:
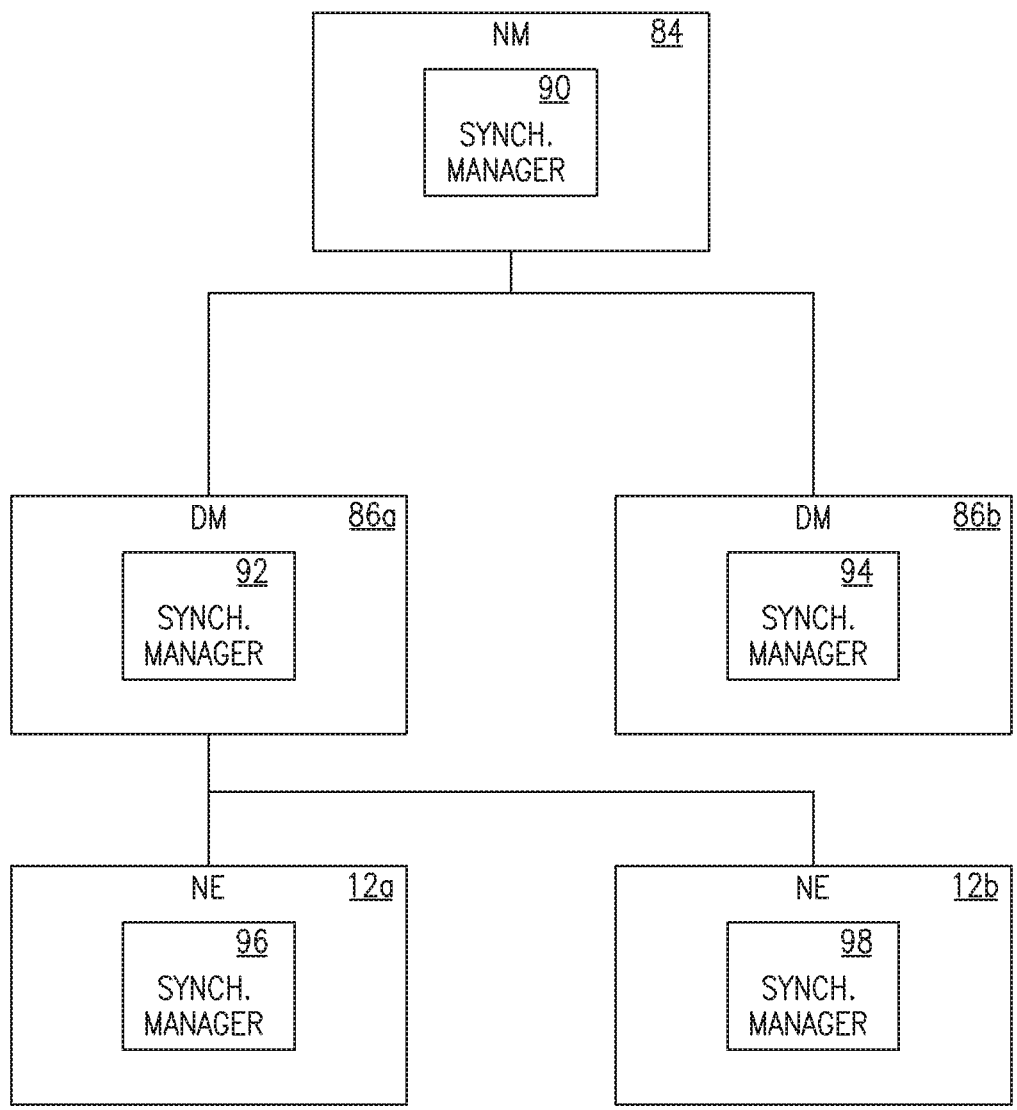
FIG. 16 is a block diagram of a network management system with distributed synchronization functions.

FIG. 16 is a block diagram of a network management system with distributed synchronization functions. The system includes a network manager 84, domain managers 86a and 86b, referred to herein collectively as domain managers 86, and network elements 12a and 12b, referred to herein collectively as network elements 12. The domain managers 86 may be MMEs and the network elements (nodes) 12 may be base stations, for example. Receipt of times T1, T2, T3 and T4 and calculation of round trip time and clock offsets discussed above with respect to node 12 may be computed in any one or more of the elements shown in FIG. 15, including at synchronization managers 90, 92, 94, 96 and 98.

Figure 17:
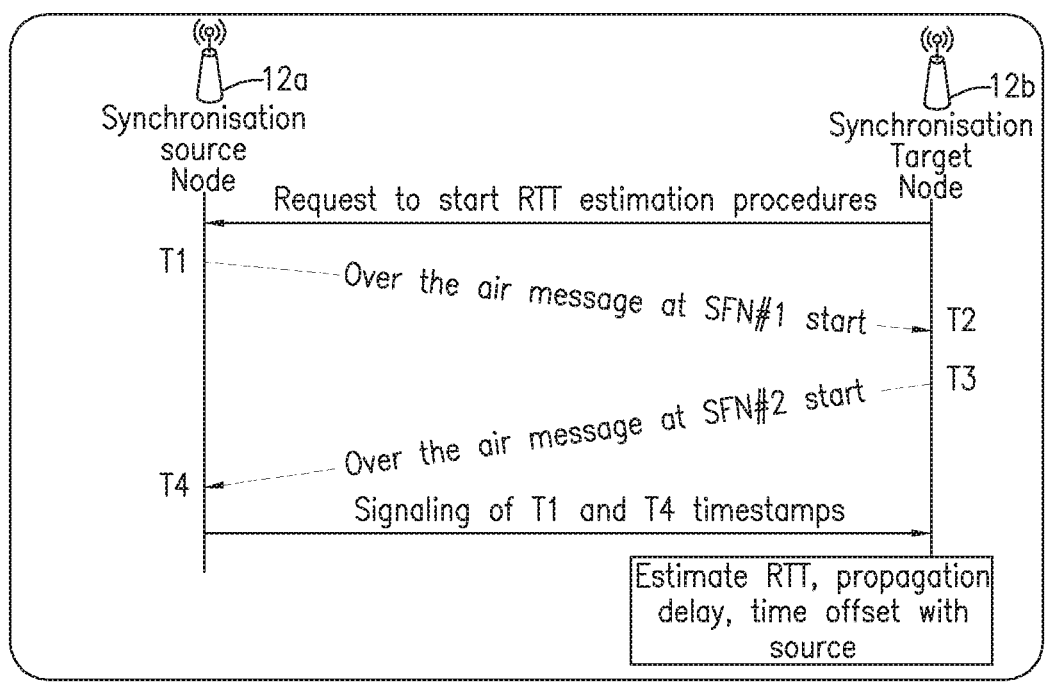
FIG. 17 is a signaling diagram for exchange of radio signals.

FIG. 17 shows a signaling diagram for achieving time synchronization between a source node and a target node. In some embodiments, to initiate RTT estimation for synchronization, the target node 12b sends a request to the source node 12a. Once the request message is received, over-the-air signaling starts, as shown in FIG. 13. The values T1, T2, T3 and T4 may be represented as integers, where each unit corresponds to a pre-configured time duration. The time values are described as follows:

T1: Time at which the source node determines that the first over the air (OTA) message, i.e., first radio signal, has been sent by the source node;

T2: Time at which the target node determines that the first OTA message from the source node has been received;

T3: Time at which the target node determines that the second OTA message, i.e., second radio signal, has been sent; and T4: Time at which the source node determines that the second OTA message from the target node has been received.

In some embodiments, the source node generates T1 whereas in other embodiments, T1 is determined by the target node from a preexisting schedule of reference signal transmissions. T4, and optionally, T1, is sent from the source node to the target node. With such information, the target node can estimate the RTT) for over the air propagation delay by calculating the quantity (T4−T1)−(T3−T2).

By dividing the RTT for over-the-air propagation delay by two, an estimation of the one-way propagation delay from source node to target node is obtained. It should be noted that such estimation takes into account the propagation delays generated by multipath transmission because the calculation relies on the message reception times as determined by the receiving node. Such reception times may be delayed due to non-line-of-sight paths.

In some embodiments, the node that generates T1 and T4 sends such times values to the node that determines T2 and T3. The node that generates T2 and T3 can therefore perform the RTT estimation and the one-way propagation time estimation between the two nodes. Of note, it is contemplated that, in some embodiments, the first time value, T1, is not actually transmitted from the source node to the target node when T1 is known and is scheduled at precise times based on a schedule. In other words, the target node will already have knowledge of T1 based on that schedule and does not need to have it sent by the source node.

In some embodiments, the node receiving a request to start RTT estimation procedures (i.e., for synchronizing) may respond to such request with a message confirming or denying that such procedures will be started. Such a message may include new timing information for the sending of messages over the air. For example it could include timing information about when the source node and the target node should send the OTA messages that will allow the determination of T1, T2, T3 and T4.

In some embodiments, the time message to stamp is a radio frame which is a base band IQ frame containing a reference signal (PSS/SSS/PRS) before the up conversion to the radio frequency in the downlink and in the uplink after the down conversion from radio frequency to base band. Base band processing needs further to derive the position of the reference signal where it actually starts relative to the start of the radio frame.

In some embodiments, a node such as a source node may receive requests to start RTT estimation procedures from multiple nodes. The node receiving multiple requests may reply to each of the requesting nodes with a message confirming or denying the start of RTT estimation procedures and specifying timing information for the start of OTA signaling with each of the requesting nodes.

Figure 18:
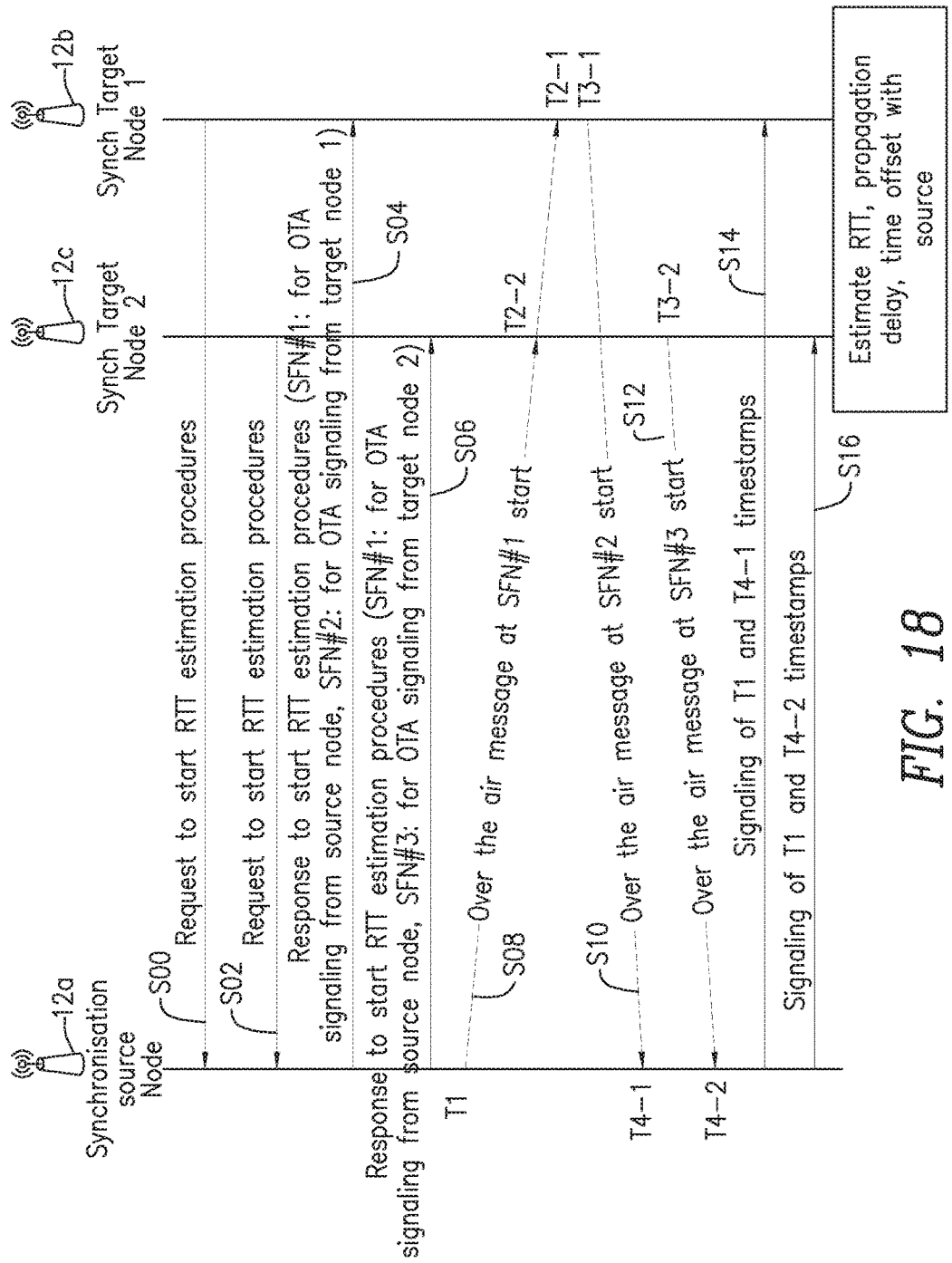
FIG. 18 is a signaling diagram for exchange of radio signals via an intermediate base station.

FIG. 18 shows that a single source node 12a can be used to synchronize multiple target nodes 12b and 12c and that the target nodes 12b and 12c are requested by the source node to start OTA signaling at different times. The latter allows the source node 12a to signal only one OTA message for all requesting target nodes 12b, 12c, while each target node 12b, 12c, can signal a different OTA message at different times suggested by the source node 12a.

In some embodiments, the source node 12a can synchronize its time base to a reference that is traceable to a time base that is common for a wide area network of base stations, e.g., Global Navigation Satellite System (GNSS), and acts as a source of wireless synchronization within a local area to a plurality of target nodes that are capable of detecting its radio signals. Further, in some embodiments, the PRS transmitted by the source node can be used by all the associated target nodes in the local area. Thus, the target nodes may be signaled the transmission and reception timestamps relative to their OTA signaling exchange and will be able to estimate the RTT, the clock offset with the source and/or the one-way propagation delay.

In a first step (S00), the target node 1 12b sends a request to start a RTT estimate to the source node 12a. In a second step (S02), at the same or a second time, the target node 2 12c sends a request to start a RTT estimate to the source node 12a. Responsive to the first request from the target node 12b, the source node 12a may send an acknowledgement, (S04), to the target node 12b. Similarly, responsive to the request from the target node 12c, the source node 12a may send an acknowledgement, (S06), to the target node 12c. At time T1, the source node 12a sends a first over the air message, at (S08), to both target nodes 12b and 12c, which arrives at target node 12c at time T2-2 and arrives at target node 12b at time T2-1. At time T3-1, the target node 12b sends a second OTA message to the source node 12a (S10) which arrives at time T4-1. At a time T3-2, the target node 12c sends a third OTA message to the source node 12a (S12) which arrives at time T4-2. The source node 12a signals the time stamp T4-1, and optionally T1, to the target node 12b (S14). The source node 12a also signals the time stamp T4-2, and optionally T1, to the target node 12c (S16). Each target node 12b and 12c can independently compute its associated RTT, one-way propagation delay, and clock offset.

In some embodiments, the node starting the RTT estimation procedures is the source node. In this embodiment, the first OTA message is sent by the target node. In some embodiments, the target node and source node can be synchronized with the help of an intermediate node. The intermediate node will provide the time stamp measurement both to the source node and the target node without itself being synchronized to either the target node or the source node.

In some embodiments, radio signals are transmitted periodically at a source node and at a target node for the purpose of maintaining synchronization. Further, in some embodiments, the radio signals are PRS that are scheduled to be transmitted at different PRS occasions (as described above) and hence be orthogonal in time. As an example, orthogonality can be achieved using different muting patterns between the source and target nodes such that each node does not transmit and receive radio signals during the same PRS occasions. In one embodiment, the scheduled radio signal transmission occasions from the source node are known by the target node. Thus, crude timing knowledge exists at the target node in order to unambiguously associate the received radio signal transmissions to the timebase of the source node. In this case, T1 timestamps do not need to be conveyed to the target node because they can be deduced.

Figure 19:
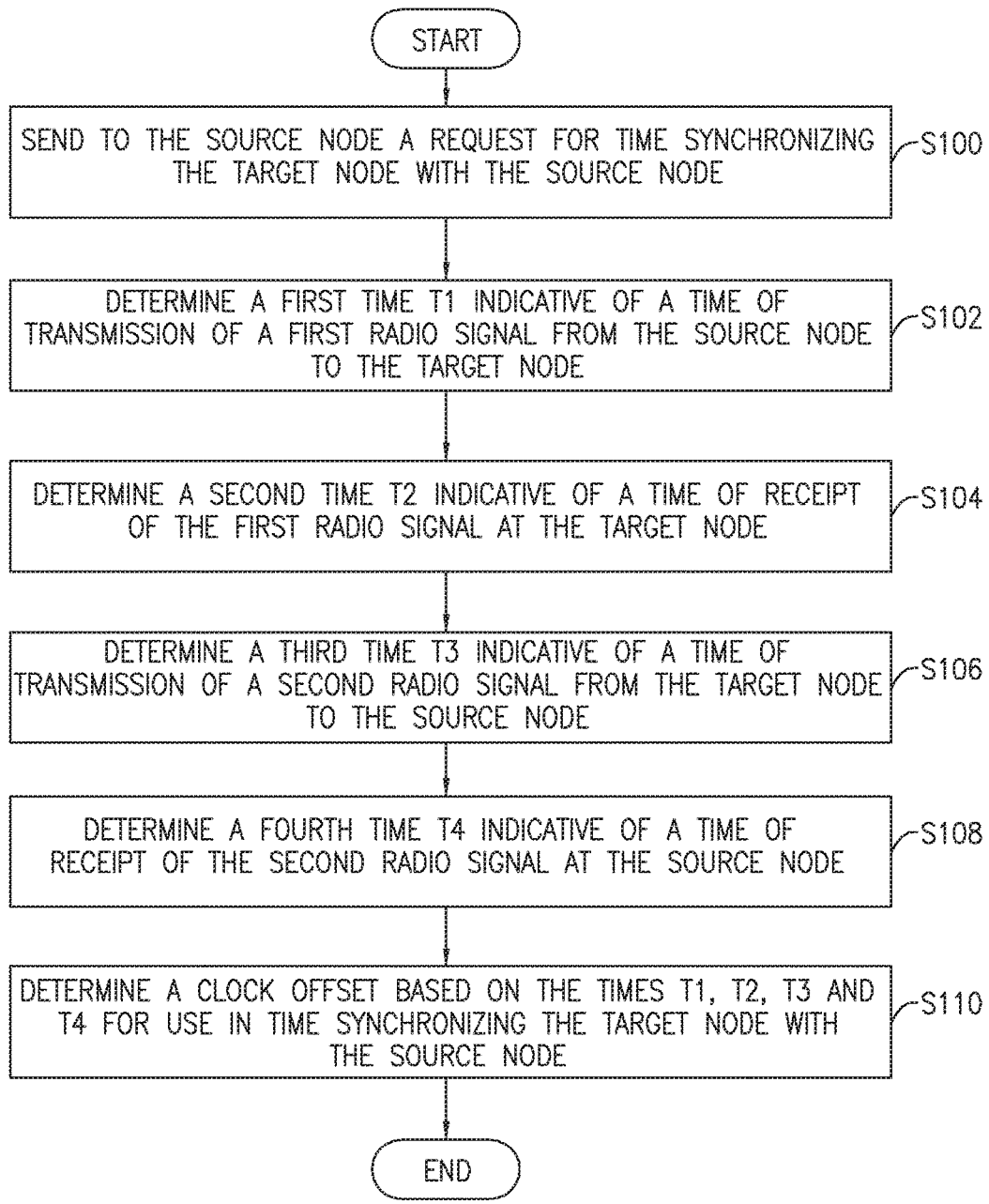
FIG. 19 is a flowchart of an exemplary process for exchanging time stamp information to determine a round trip time, the process steps being performed by a target node.

FIG. 19 is a flowchart of an exemplary process for synchronization between a source node 12a and a target node 12b. A node, such as a centralized server 70, the source node 12a, the target node 12b, etc., sends a request to a source node 12a for time synchronizing the target node 12b with the source node 12a (block S100). The node determines a first time T1 indicative of a time of transmission of a first radio signal from the source node 12a to the target node 12b (block S102). A second time, T2, is determined and indicates a time of receipt of the first radio signal at the target node (block S104). The node also determines a third time, T3, indicating a time of transmission of a second radio signal from the target node 12b to the source node 12a (block S106). The node determines a fourth time, T4, being a time of receipt of the second radio signal at the source node (block S108). The clock offset is determined based on the times T1, T2, T3 and T4 for use in time synchronizing the target node with the source node (block S110). In one embodiment the node, such as the centralized server 70, determines the clock offset for synchronizing the target node 12b with the source node 12a. The target node synchronizes to the source node based on the clock offset. In one embodiment. the node may also calculate the round trip time as (T4−T1)−(T3−T2). It is noted that, while the first radio signal is received by the target node prior to the target node sending the second radio signal, the first radio signal is independent of the second radio signal and in some embodiments, can be transmitted after or at some other time. Generally, to the extent each of the source and target nodes can properly determine the transmission and reception times T1, T2, T3, T4 (e.g., with appropriate muting patterns and/or transmission times configured such that each nodes does not simultaneously transmit and receive at the same time), the order in which the first and second radio signals are transmitted can vary.

Figure 20:
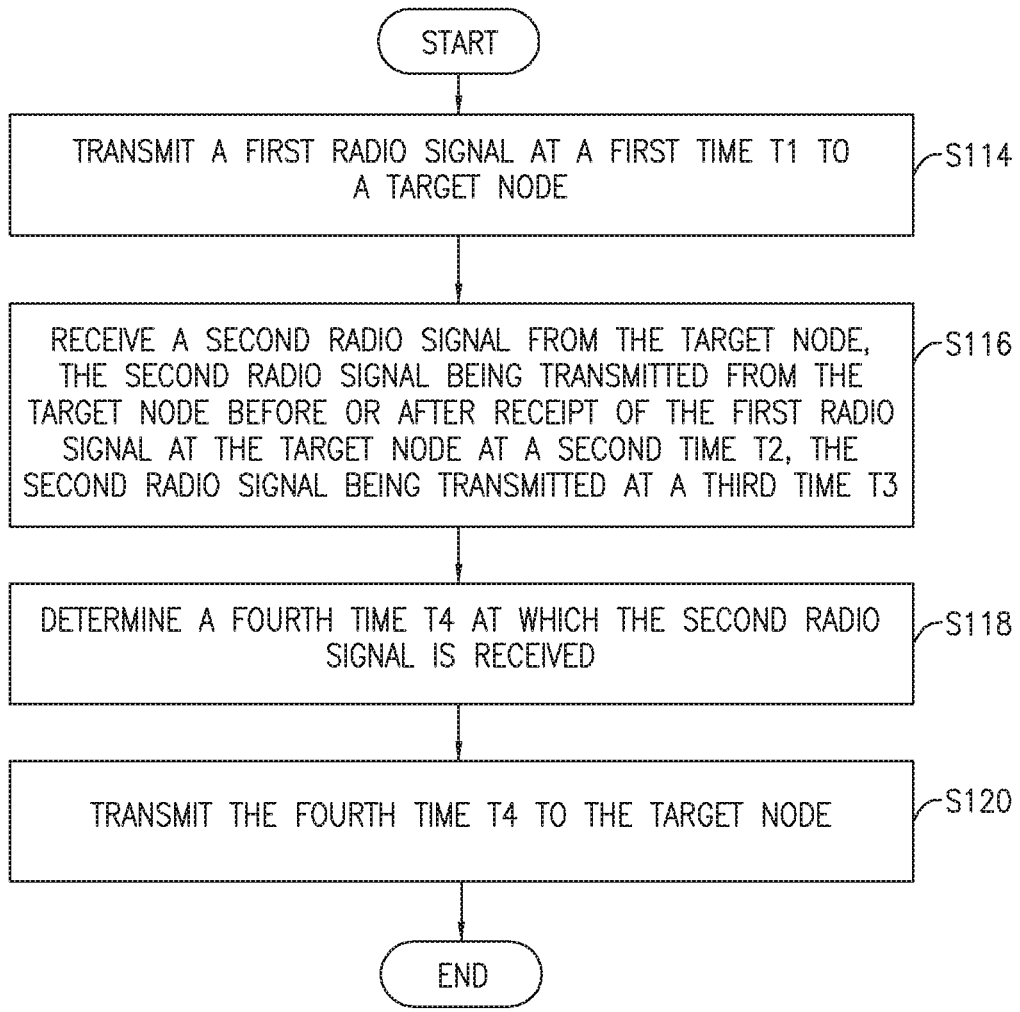
FIG. 20 is a flowchart of an exemplary process for exchanging time stamp information to determine a round trip time, the process steps being performed by a source node.

FIG. 20 is a flowchart of an exemplary process for synchronization of a target node and a source node, the process steps being performed by the source node. A first radio signal is transmitted at a first time T1 to a target node (block S114). A second radio signal is received from the target node before or after the target node receives the first radio signal at a time T2. The second radio signal is transmitted from the target node at a time T3 (block S116). The source node determines a time T4 at which the second radio signal is received at the source node (block S118). The time T4 (and optionally T1 if not determined based on a schedule) is sent to the target node (block S120). In another embodiment the time T4 is sent to a node other than the target node, such as a centralized server, that determines the clock offset for synchronizing the target node with the source node.

Embodiments described herein allow a more accurate synchronization to a detected source synchronization reference signal by compensating the propagation delays using time stamp of transmission and reception of over the air messages between two eNBs used to achieve over the air synchronization. This synchronization procedure gives a better correlation to the real propagation delay to which the synchronization signals are subject.

Some embodiments enable correct functioning of all the features that require accurate synchronization between neighbor cells, such as eICIC, TDD transmission, Network Assisted Interference Cancellation and Suppression (NAICS), Coordinated MultiPoint transmission and reception (CoMP).

Some methods described herein avoid accumulation of propagation delays for nodes synchronizing to synchronization sources of Stratum Level higher than zero. Without a way to compensate for propagation delays, a node that synchronizes with a synchronization source that is connected to a fully synchronized signal source would be subject to a synchronization error which is the accumulation of propagation delays over the two hops: the first between the fully synchronized signal and the synchronization source and the second that is between the synchronization source and the synchronization target.

By means of a more accurate inter node synchronization the overall system capacity increases due to reduced losses due to cross cell interference. Some methods described herein also enable synchronizing a node with the help from a node with different clock domain By doing so, a more complex and flexible synchronization scheme can be established.

Embodiments can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible.

What is claimed is:

1. A method of wirelessly time synchronizing a target node with a source node, the method comprising:
   sending to the source node a request for time synchronizing the target node with the source node;
   determining a first time, T1, indicative of a time of transmission of a first radio signal from the source node to the target node;
   determining a second time, T2, indicative of a time of receipt of the first radio signal at the target node;
   determining a third time, T3, indicative of a time of transmission of a second radio signal from the target node to the source node, the first and second radio signals comprising periodic reference signals;
   configuring second radio signal transmissions with a muting pattern such that the third time, T3, indicative of the time of transmission of the second radio signal from the target node to the source node does not overlap with the second time, T2, indicative of the time of receipt of the first radio signal at the target node;
   determining a fourth time, T4, indicative of a time of receipt of the second radio signal at the source node; and
   determining a clock offset based on the times T1, T2, T3 and T4 for use in time synchronizing the target node with the source node.

2. The method of claim 1, wherein determining the clock offset comprises calculating the clock offset as a function of a round trip time expressed as (T4−T1)−(T3−T2).

3. The method of claim 2 wherein determining the clock offset comprises calculating the clock offset as a function of an average of round trip times calculated for a plurality of first and second radio signals.

4. The method of claim 1 wherein determining the clock offset comprises calculating the clock offset as one of [(T2−T1)−RTT/2] and [(T3−T4)+RTT/2], where RTT is a round trip time expressed as (T4−T1)−(T3−T2).

5. The method of claim 1 further comprising adjusting a clock of the target node based on the clock offset determined.

6. The method of claim 1, wherein each of the first and second radio signals comprises a downlink reference signal that is one of a position reference signal (PRS), a primary synchronization signal (PSS), and a secondary synchronization signal (SSS).

7. The method of claim 1 wherein the first and second radio signals comprise periodic reference signals scheduled for transmission using common radio frequency resources.

8. The method of claim 1 wherein the determining steps are performed at the target node, the method further comprising:
  receiving the first radio signal from the source node at the first time, T1; and
  transmitting the second radio signal to the source node at the second time, T2.

9. The method of claim 1 wherein the time T1 and the time T3 are determined based on a transmission schedule for the first and second radio signals.

10. The method of claim 1 wherein determining the fourth time, T4 comprises receiving the time T4 from the source node via one of a direct and indirect interface.

11. The method of claim 10 wherein the direct interface is an X2 interface and the indirect interface is an S1 interface.

12. The method of claim 1 further comprising selecting the source node as a synchronization source node among a plurality of candidate synchronization source nodes based on an observed quality characteristic of one of a radio signal and a round trip time between each of the candidate synchronization source nodes and the target node.

13. The method of claim 12 wherein the time synchronization information is received via one of an X2 or S1 interface.

14. The method of claim 1 wherein at least one of the times T1, T2, T3 and T4 is defined at an Antenna Reference Point (ARP).

15. The method of claim 1 wherein at least one of the times T1 and T4 is calibrated to compensate for a source node internal processing delay and wherein at least one of the times T2 and T3 is calibrated to compensate for a target node internal processing delay.

16. A node configured to wirelessly time synchronize a target node with a source node, the node comprising:
  a processor;
  a memory configured to store instructions that, when executed by the processor, cause the node to:
    send to the source node a request for time synchronizing the target node with the source node;
    determine a first time, T1, indicative of a time of transmission of a first radio signal from the source node to the target node;
    determine a second time, T2, indicative of a time of receipt of the first radio signal at the target node;
    determine a third time, T3, indicative of a time of transmission of a second radio signal from the target node to the source node, the first and second radio signals comprising periodic reference signals;
    configure second radio signal transmissions with a muting pattern such that the third time, T3, indicative of the time of transmission of the second radio signal from the target node to the source node does not overlap with the second time, T2, indicative of the time of receipt of the first radio signal at the target node;
    determine a fourth time, T4, indicative of a time of receipt of the second radio signal at the source node; and
    determine a clock offset based on the times T1, T2, T3 and T4 for use in time synchronizing the target node with the source node.

17. The node of claim 16, wherein to determine the clock offset, the instructions further cause the node to calculate the clock offset as a function of a round trip time expressed as (T4−T1)−(T3−T2).

18. The node of claim 17 wherein to determine the clock offset, the instructions further cause the node to calculate the clock offset as a function of an average of round trip times calculated for a plurality of first and second radio signals.

19. The node of claim 16 wherein to determine the clock offset, the instructions further cause the node to calculate clock offset as one of [(T2−T1)−RTT/2] and [(T3−T4)+RTT/2], where RTT is a round trip time expressed as (T4−T1)−(T3−T2).

20. The node of claim 16 wherein the instructions further cause the node to adjust a clock of the target node based on the clock offset determined.

21. The node of claim 16, wherein each of the first and second radio signals comprises a downlink reference signal that is one of a position reference signal (PRS), a primary synchronization signal (PSS), and a secondary synchronization signal (SSS).

22. The node of claim 16 wherein the first and second radio signals comprise periodic reference signals scheduled for transmission using common radio frequency resources.

23. The node of claim 16 wherein the node comprises the target node and wherein the instructions further cause the target node to:
  receive the first radio signal from the source node at the first time, T1; and
  transmit the second radio signal to the source node at the second time, T2.

24. The node of claim 16 wherein the time T1 and the time T3 are determined based on a transmission schedule for the first and second radio signals.

25. The node of claim 16 wherein to determine the fourth time, T4, the instructions further cause the node to receive the time T4 from the source node via one of a direct and indirect interface.

26. The node of claim 25 wherein the direct interface is an X2 interface and the indirect interface is an S1 interface.

27. The node of claim 16 wherein the instructions further cause the node to select the source node as a synchronization source node among a plurality of candidate synchronization source nodes based on an observed quality characteristic of one of a radio signal and a round trip time between each of the candidate synchronization source nodes and the target node.

28. The node claim 27 wherein the time synchronization information is received via one of an X2 or S1 interface.

29. The node of claim 16 wherein at least one of the times T1, T2, T3 and T4 is defined at an Antenna Reference Point (ARP).

30. The node of claim 16 wherein at least one of the times T1 and T4 is calibrated to compensate for a source node internal processing delay and wherein at least one of the times T2 and T3 is calibrated to compensate for a target node internal processing delay.

31. A non-transitory computer readable memory configured to store executable instructions that when executed by a processor, configure the processor to:
  send to a source node a request for time synchronizing a target node with the source node;
  determine a first time, T1, indicative of a time of transmission of a first radio signal from the source node to the target node;
  determine a second time, T2, indicative of a time of receipt of the first radio signal at the target node;
  determine a third time, T3, indicative of a time of transmission of a second radio signal from the target node to the source node, the first and second radio signals comprising periodic reference signals;
  configure second radio signal transmissions with a muting pattern such that the third time, T3, indicative of the time of transmission of the second radio signal from the target node to the source node does not overlap with the second time, T2, indicative of the time of receipt of the first radio signal at the target node;

determine a fourth time, T4, indicative of a time of receipt of the second radio signal at the source node; and determine a clock offset based on the times T1, T2, T3 and T4 for use in time synchronizing the target node with the source node.

* * * * *